(12) United States Patent
Suehiro et al.

(10) Patent No.: US 11,343,410 B2
(45) Date of Patent: May 24, 2022

(54) INFORMATION PROCESSING DEVICE, PROCESSING METHOD OF CONFIRMING SPECIAL COLOR, AND PROCESSING PROGRAM

(71) Applicant: SEIKO EPSON CORPORATION, Tokyo (JP)

(72) Inventors: Konatsu Suehiro, Matsumoto (JP); Kanji Kamijima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/233,957

(22) Filed: Apr. 19, 2021

(65) Prior Publication Data
US 2021/0329145 A1 Oct. 21, 2021

(30) Foreign Application Priority Data
Apr. 21, 2020 (JP) .............................. JP2020-075260

(51) Int. Cl.
*H04N 1/60* (2006.01)
*G06F 3/12* (2006.01)
*G01J 3/46* (2006.01)

(52) U.S. Cl.
CPC .............. *H04N 1/6027* (2013.01); *G01J 3/46* (2013.01); *G06F 3/1208* (2013.01); *G06F 3/1251* (2013.01); *G06F 3/1256* (2013.01)

(58) Field of Classification Search
CPC ... H04N 1/6027; G06F 3/1208; G06F 3/1251; G06F 3/1256; G01J 3/46
USPC ........................................................ 358/1.9
See application file for complete search history.

(56) References Cited

U.S. PATENT DOCUMENTS

| 2005/0213124 A1* | 9/2005 | Takeshita | H04N 1/6055 358/1.9 |
| 2013/0308145 A1* | 11/2013 | Yoshida | G06K 15/407 358/1.9 |
| 2019/0222716 A1* | 7/2019 | Morikawa | G06F 3/1256 |

FOREIGN PATENT DOCUMENTS

JP            2016186690 A      10/2016

* cited by examiner

*Primary Examiner* — Allen H Nguyen
(74) *Attorney, Agent, or Firm* — Chip Law Group

(57) ABSTRACT

An information processing device configured to make a printing device execute printing includes a storage section configured to store special color data representing a special color included in a print target image, and a processing section configured to make the printing device print a special color patch as a color patch of the special color included in the print target image based on the special color data to obtain a colorimetric value of the special color patch. Based on the print target image and the special color data, the processing section makes the printing device execute printing of the special color patch in accordance with output of a print image based on the print target image.

9 Claims, 16 Drawing Sheets

| PLACEMENT ITEM | PRINT POSITION OF SPECIAL COLOR PATCH |
|---|---|
| AUTOMATIC PLACEMENT NEARBY SPECIAL COLOR (MAIN SCANNING DIRECTION) |  |
| AUTOMATIC PLACEMENT NEARBY SPECIAL COLOR (SUB-SCANNING DIRECTION) |  |
| PLACEMENT LOWER RIGHT OF IMAGE |  |
| PLACEMENT UPPER RIGHT OF IMAGE |  |
| PLACEMENT LOWER LEFT OF IMAGE |  |
| PLACEMENT UPPER LEFT OF IMAGE |  |

| (L, a, b) | (C, M, Y, K) |
|---|---|
| (Lg1, ag1, bg1) | (C1, M1, Y1, K1) |
| (Lg2, ag2, bg2) | (C2, M2, Y2, K2) |
| ⋮ | ⋮ |
| (Lgi, agi, bgi) | (Ci, Mi, Yi, Ki) |
| ⋮ | ⋮ |
| (Lgn, agn, bgn) | (Cn, Mn, Yn, Kn) |

INFORMATION PROCESSING DEVICE, PROCESSING METHOD OF CONFIRMING SPECIAL COLOR, AND PROCESSING PROGRAM

The present application is based on, and claims priority from JP Application Serial Number 2020-075260, filed Apr. 21, 2020, the disclosure of which is hereby incorporated by reference herein in its entirety.

BACKGROUND

1. Technical Field

The present disclosure relates to a technology for verifying a special color included in a print image.

2. Related Art

In apart printed with a special color which is a particular color such as a corporate color, it is necessary for the color designated by a user to accurately be reproduced. A print control device disclosed in JP-A-2016-186690 displays RGB pixel data on a special color setting screen, receives pointing of a position of a special color included in the RGB pixel data, stores a color value provided to the pixel at the position where the pointing is received, and then makes patch images respectively based on the color value and the color values of the peripheral colors be printed. The user visually selects the patch image of a color appropriate as the special color out of these patch images, and then performs an operation of inputting a patch number of the patch image thus selected.

When the area of the special color included in the RGB pixel data is small, or provided with gradation, it is difficult to accurately point the position of the special color. When there is an error in the position thus pointed, the accuracy of color matching of the special color deteriorates.

SUMMARY

An information processing device according to an aspect of the present disclosure is an information processing device configured to make a printing device execute printing, including a storage section configured to store special color data representing a special color included in a print target image, and a processing section configured to make the printing device print a special color patch as a color patch of the special color included in the print target image based on the special color data to obtain a colorimetric value of the special color patch, wherein based on the print target image and the special color data, the processing section makes the printing device execute printing of the special color patch in accordance with output of a print image based on the print target image.

Further, a processing method according to another aspect of the present disclosure is a processing method of verifying a special color included in a print image, the method including a print control step of making a printing device print a special color patch as a color patch of the special color included in a print target image based on special color data representing the special color included in the print target image, and a colorimetric value acquisition step of obtaining a colorimetric value of the special color patch, wherein in the print control step, based on the print target image and the special color data, the printing device is made to execute printing of the special color patch in accordance with output of the print image based on the print target image.

Further, a non-transitory computer-readable storage medium storing a processing program according to another aspect of the present disclosure is a non-transitory computer-readable storage medium storing a processing program of verifying a special color included in a print image, the processing program making a computer implement a print control function of making a printing device print a special color patch as a color patch of the special color included in a print target image based on special color data representing the special color included in the print target image, and a colorimetric value acquisition function of obtaining a colorimetric value of the special color patch, wherein based on the print target image and the special color data, the print control function makes the printing device execute printing of the special color patch in accordance with output of the print image based on the print target image.

BRIEF DESCRIPTION OF THE DRAWINGS

FIG. 8 is a diagram schematically showing a structure example of a color conversion table.

DESCRIPTION OF AN EXEMPLARY EMBODIMENT

Hereinafter, an embodiment of the present disclosure will be described. Obviously, the following embodiment is nothing more than an illustration of the present disclosure, and all of the features shown in the embodiment are not necessarily essential for means for the solution of the present disclosure.

(1) OUTLINE OF TECHNOLOGY INCLUDED IN PRESENT DISCLOSURE

First, an outline of the technology included in the present disclosure will be described with reference to examples shown in FIG. 1 through FIG. 16. It should be noted that the drawings in the present application are each a diagram schematically showing an example, magnification rates in respective directions shown in these diagrams are different from each other in some cases, and the diagrams fail to match each other in some cases. Obviously, each of the elements of the present technology is not limited to a specific example denoted by a reference symbol. In the "outline of the technology included in the present disclosure," words in parentheses each mean a supplemental explanation of the word immediately before the parenthesis.

Figure 1:
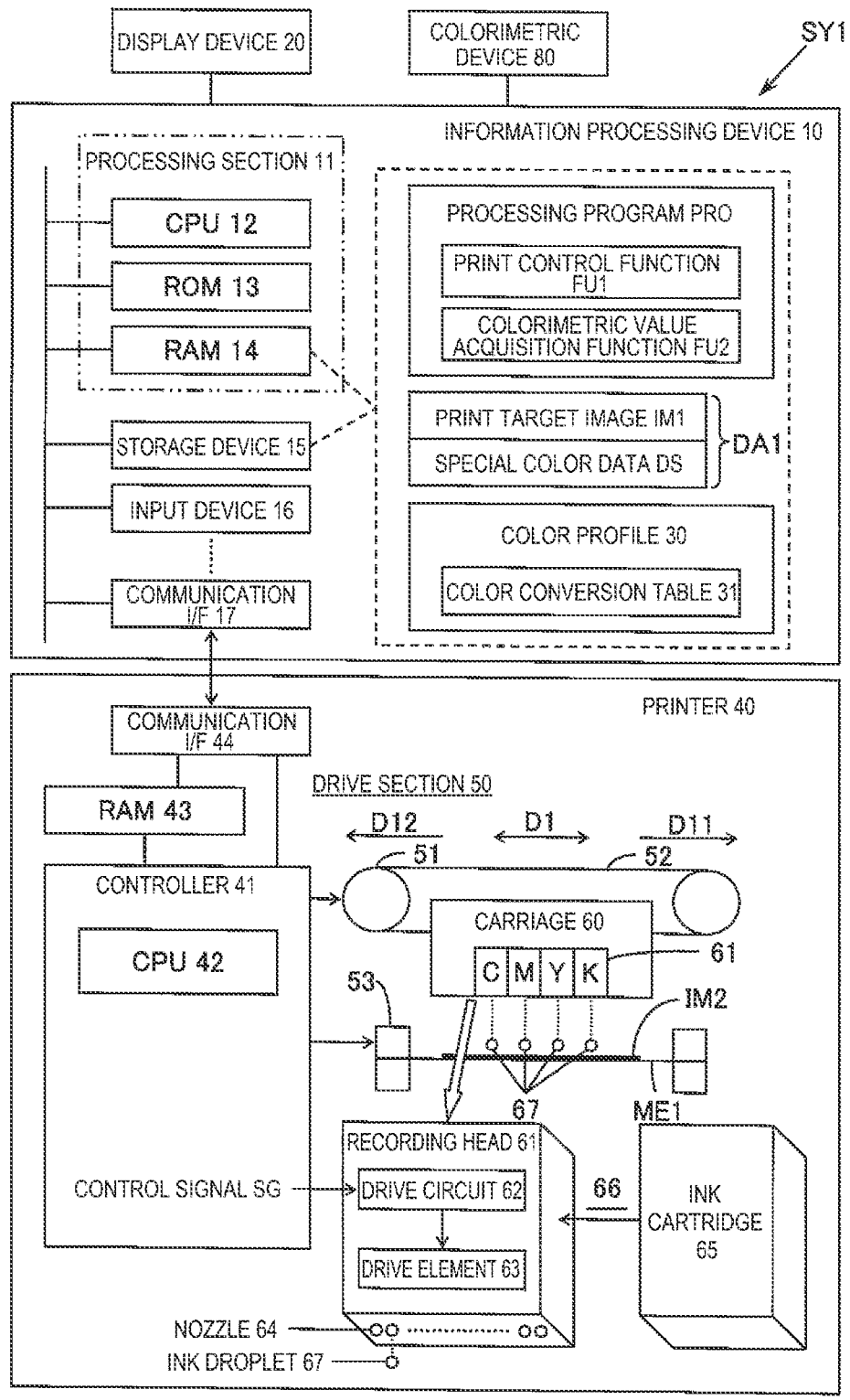
FIG. 1 is a block diagram schematically showing a configuration example of an information processing system.

Aspect 1:

As illustrated in FIG. 1, an information processing device 10 according to an aspect of the present technology is an information processing device 10 for making a printing device (e.g., a printer 40) perform printing, and is provided with a storage section (e.g., a storage device 15) and a processing section (e.g., a control section 11). The storage section (15) stores special color data DS representing a special color SC included in a print target image IM1. The processing section 11 makes the printing device (40) print a special color patch PS as a color patch of the special color SC included in the print target image IM1 based on the special color data DS, and then obtains a colorimetric value of the special color patch PS. Based on the print target image IM1 and the special color data DS, the processing section 11 makes the printing device (40) perform printing of the special color patch PS in accordance with output of a print image IM2 based on the print target image IM1.

In the aspect described above, since the printing of the special color patch PS is performed in accordance with the output of the print image IM2, it is possible to surely perform the colorimetry of the special color SC corresponding to the print image IM2, and thus, it is possible to suppress a colorimetric failure. Therefore, it is possible for the present aspect to suppress the degradation in accuracy of the color matching of the special color.

Here, making the printing device perform printing of the special color patch in accordance with the output of the print image means that a relationship exists between the output operation of the print image and the printing operation of the special color patch. As long as the relationship exists, the print image and the special color patch can be formed not only in the same print target object (print substrate), but also in respective print target objects different from each other.

It should be noted that the additional remarks described above are also applied to the following aspects.

Figure 2:
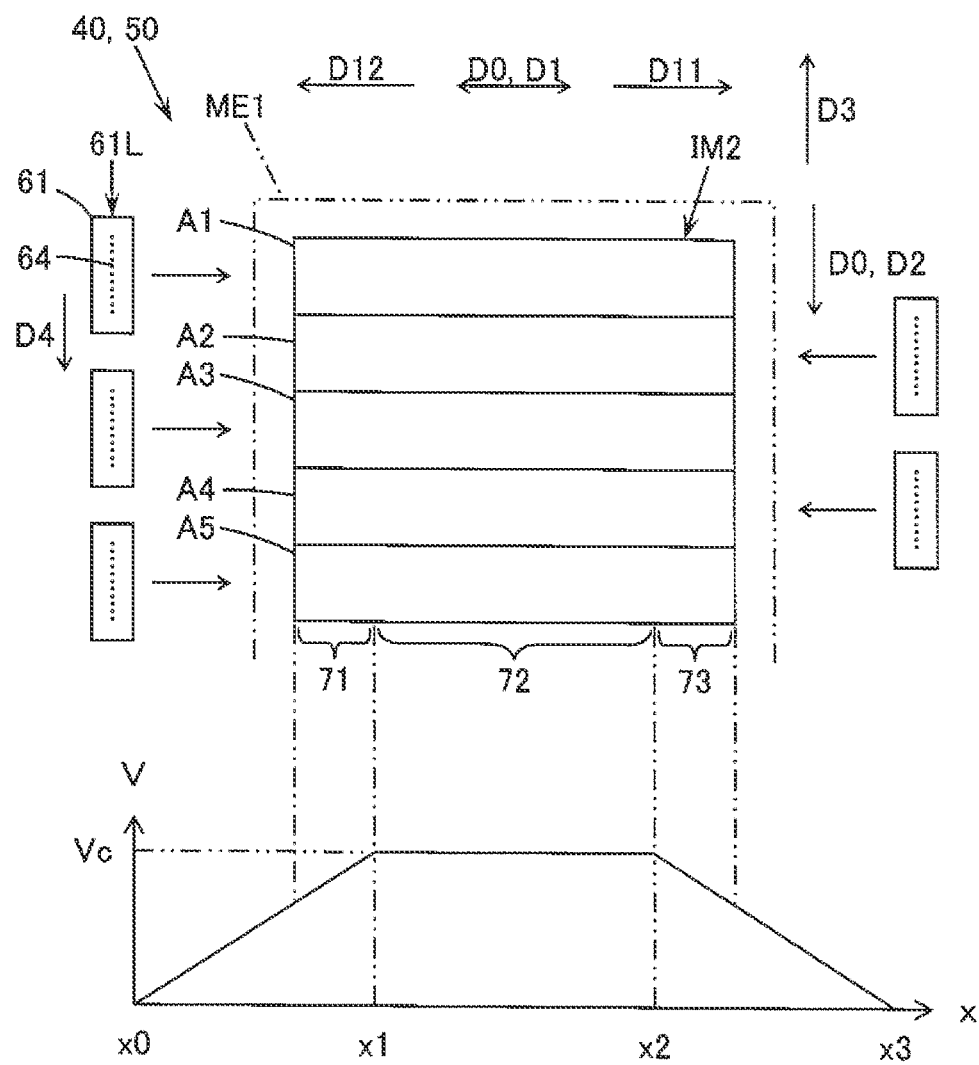
FIG. 2 is a diagram schematically showing an example of a relative displacement between a print target object and a recording head.
Figure 4:
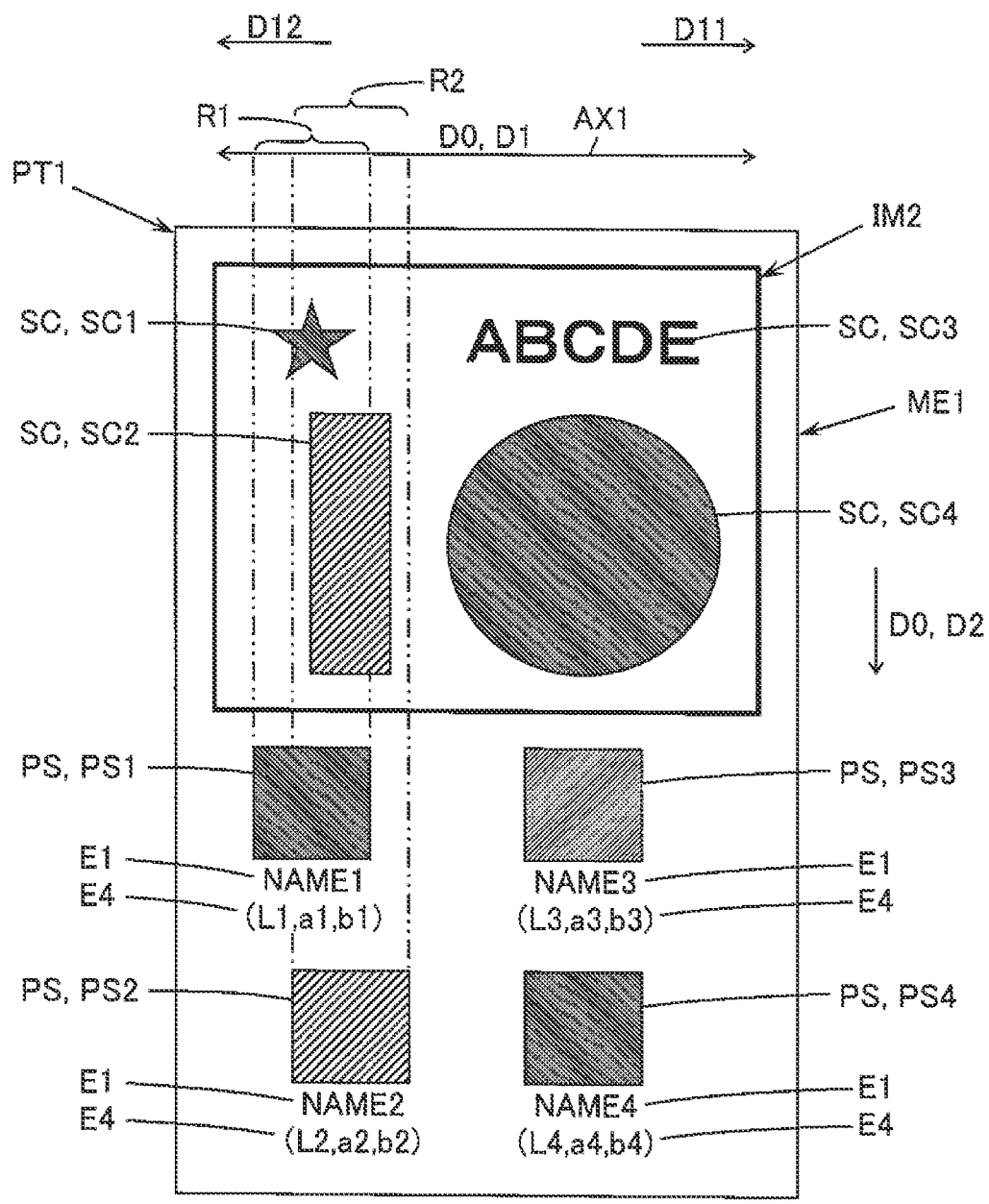
FIG. 4 is a diagram schematically showing an example of a print object including a print image and a special color patch.

Aspect 2:

As illustrated in FIG. 1 and FIG. 2, the printing device (40) can be provided with a drive section 50 for relatively moving a print target object ME1 and a recording head 61 for performing recording on the print target object ME1 in a scanning direction D0. As illustrated in FIG. 4, it is possible for the processing section 11 to perform control of matching the position of the special color patch PS with the position of the special color SC included in the print image IM2 in the scanning direction D0. Here, matching the position of the special color patch PS with the position of the special color SC in the scanning direction D0 means that it is arranged that when projecting the special color patch PS and the special color SC to an imaginary axis AX1 extending along the scanning direction D0, the projection position of the special color patch PS and the projection position of the special color SC are aligned with each other.

In the present aspect, since the position of the special color patch PS is aligned with the position of the special color SC included in the print image IM2 in the scanning direction D0, it is possible to improve the accuracy of the color matching of the special color.

Here, the relative displacement between the print target object and the recording head includes that the print target object does not move while the recording head moves, that the recording head does not move while the print target object moves, and that both of the print target object and the recording head move. These additional remarks are also applied to the following aspects.

Aspect 3:

As illustrated in FIG. 2, it is possible for the scanning direction D0 to include a main scanning direction D1 in which the print target object ME1 and the recording head 61 relatively move when the recording is performed, and a sub-scanning direction D2 which is the sub-scanning direction D2 crossing the main scanning direction D1, and in which the print target object ME1 and the recording head 61 relatively move when the recording is not performed. It is possible for the processing section 11 to perform control of matching the position of the special color patch PS with the position of the special color SC included in the print image IM2 in at least one of the main scanning direction D1 and the sub-scanning direction D2. In the present aspect, since the position of the special color patch PS is aligned with the position of the special color SC included in the print image IM2 in at least one of the main scanning direction D1 and the sub-scanning direction D2, it is possible to improve the accuracy of the color matching of the special color.

For example, when the position of the special color patch PS is aligned with the position of the special color SC included in the print image IM2 in the main scanning direction D1, regarding the velocity variation in the relative displacement between the print target object ME1 and the recording head 61 in the main scanning direction D1, it is possible to match the velocity variation when forming the special color patch PS with the velocity variation when forming the special color SC included in the print image IM2. Thus, a difference in color development due to a difference in velocity variation in relative displacement is suppressed, and the accuracy of the color matching of the special color is improved.

Further, when the position of the special color patch PS is aligned with the position of the special color SC included in the print image IM2 in the sub-scanning direction D2, it is possible to match the sub-scanning when forming the special color patch PS with the sub-scanning when forming the special color SC included in the print image IM2. Thus, a difference in color development due to a difference in relative displacement in the sub-scanning is suppressed, and the accuracy of the color matching of the special color is improved.

Figure 3:
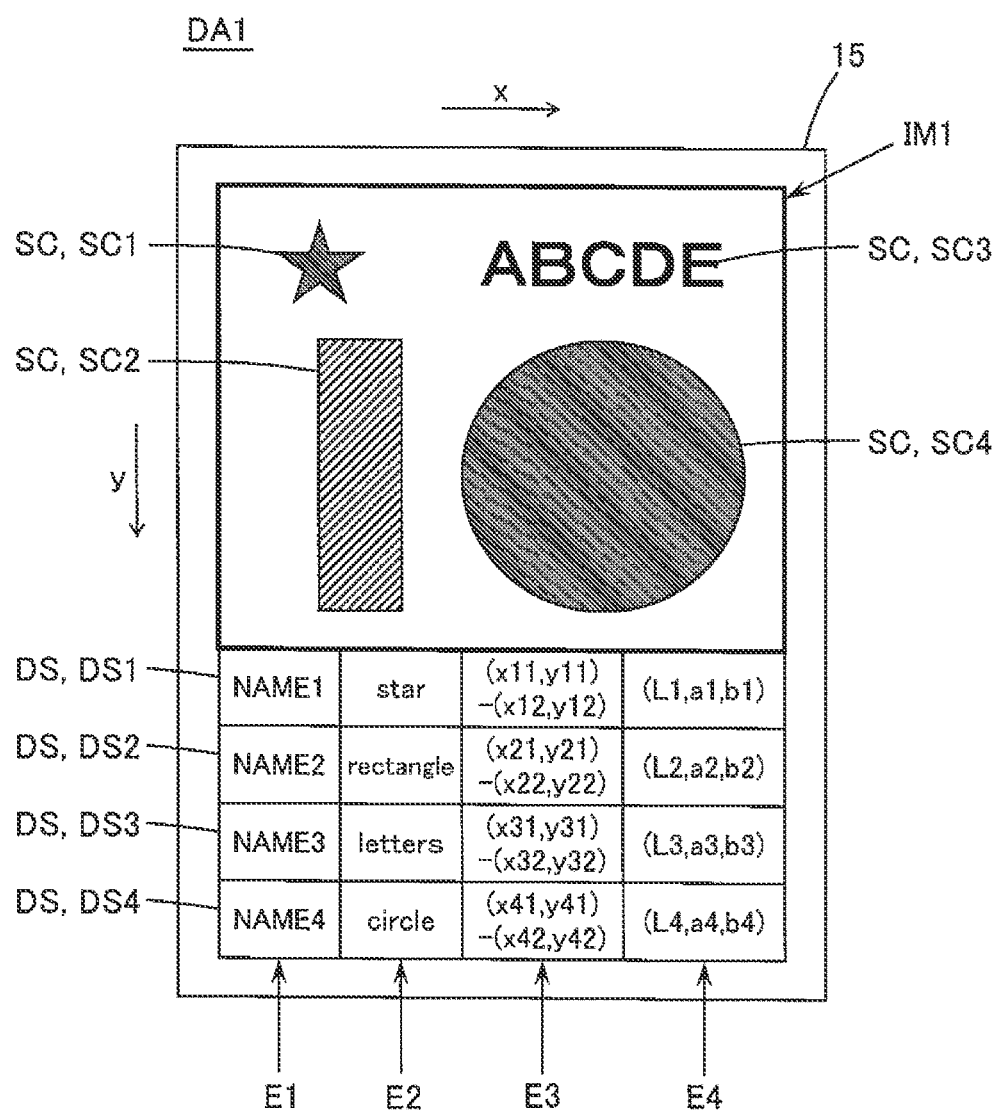
FIG. 3 is a diagram schematically showing a structure example of print target image data stored in a storage section.

Aspect 4:

As illustrated in FIG. 3, it is possible for the special color SC included in the print target image IM1 to include a first special color (e.g., a special color SC1) and a second special color (e.g., a special color SC2) different from the first special color (SC1). As illustrated in FIG. 4, it is possible for the special color patchs PS to include a first special color patch (e.g., a special color patch PS1) as a color patch of the first special color (SC1), and a second special color patch (e.g., a special color patch PS2) as a color patch of the second special color (SC2). When there is an overlap between a print range R1 of the first special color patch (PS1) and a print range R2 of the second special color patch (PS2) in the scanning direction D0, it is possible for the processing section 11 to perform control of shifting the print range R1 of the first special color patch (PS1) and the print range R2 of the second special color patch (PS2) from each other in a direction perpendicular to the scanning direction D0. In the present aspect, since the position of each of the special color patches PS is aligned with the position of the corresponding special color SC included in the print image IM2 in the scanning direction D0 even when the special colors SC included in the print image IM2 overlap each other in the scanning direction D0, it is possible to provide a suitable example of improving the accuracy of the color matching of the special color.

Here, the terms "first," "second," . . . in the present application are the terms for distinguishing the constituents from each other, and do not mean the order.

The fact that there is an overlap between the print range of the first special color patch and the print range of the second special color patch in the scanning direction includes all of that at least a part of the print range of the second special color patch overlaps the entire print range of the first special color patch in the scanning direction, that at least a part of the print range of the second special color patch overlaps a part of the print range of the first special color patch in the scanning direction, that at least a part of the print range of the first special color patch overlaps the entire print range of the second special color patch in the scanning direction, and that at least a part of the print range of the first special color patch overlaps a part of the print range of the second special color patch in the scanning direction.

The additional remarks described above are also applied to the following aspects.

Figure 12:
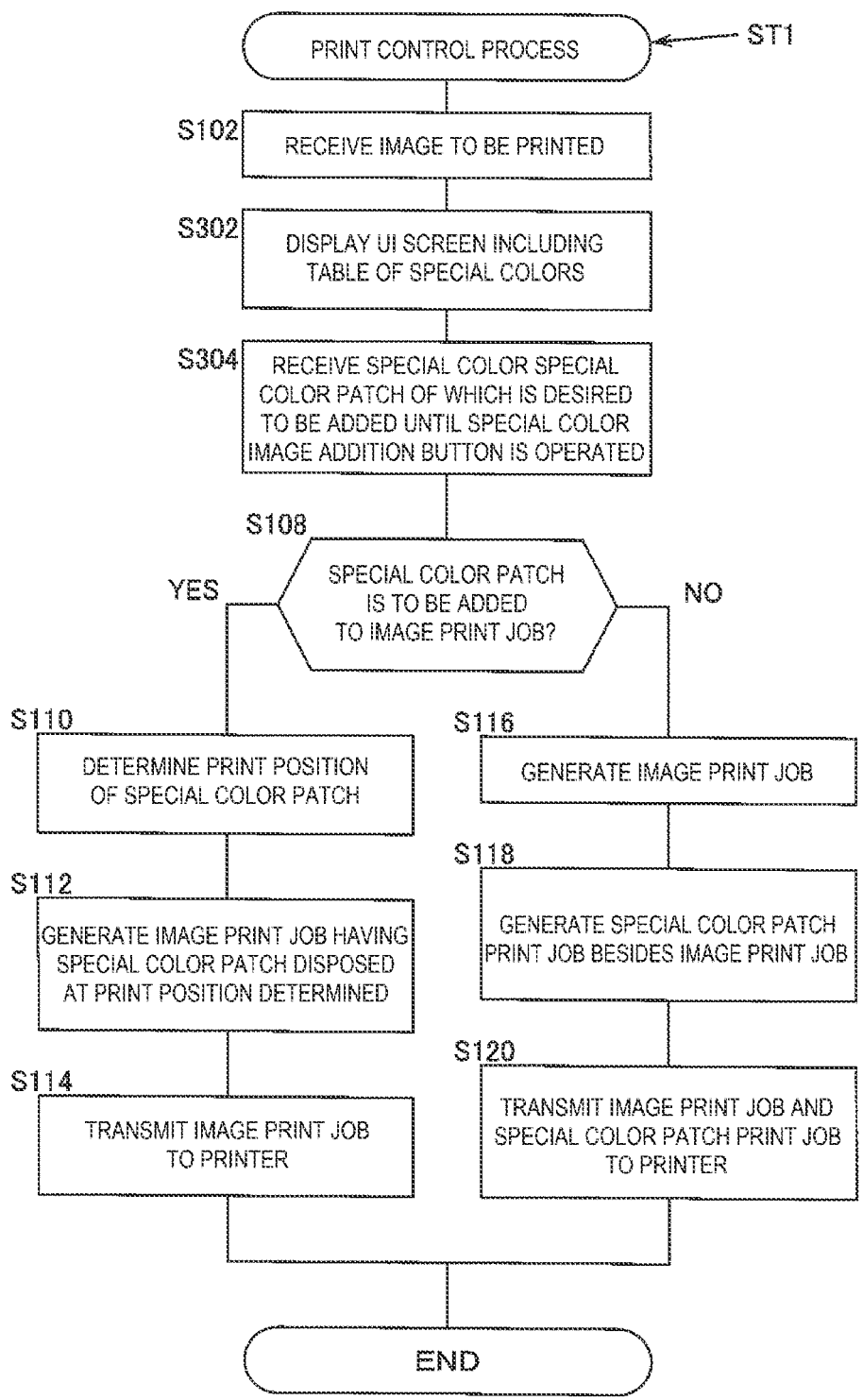
FIG. 12 is a flowchart showing another example of the print control process performed by the information processing device.
Figure 13:
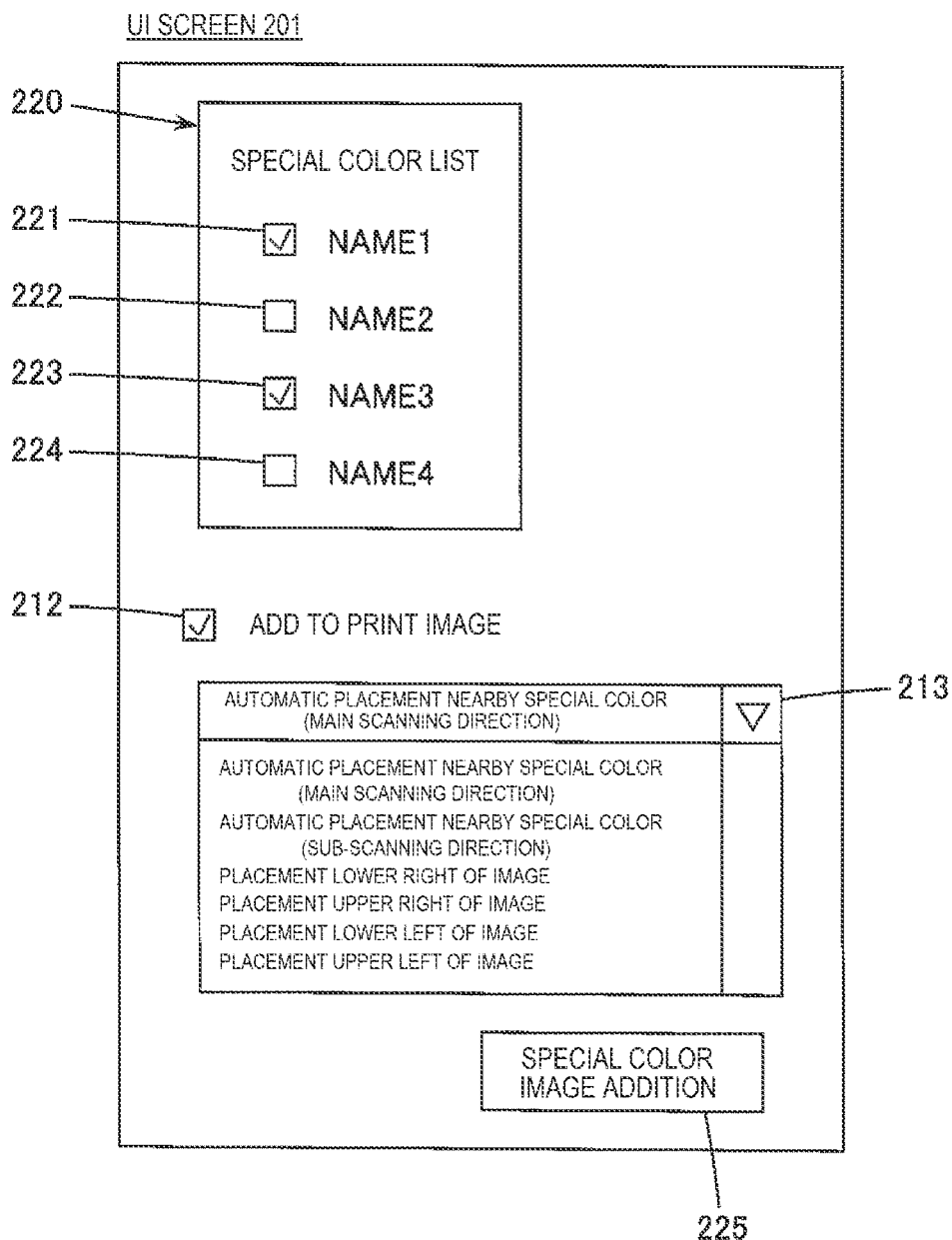
FIG. 13 is a diagram schematically showing another example of the user interface screen.
Figure 14:
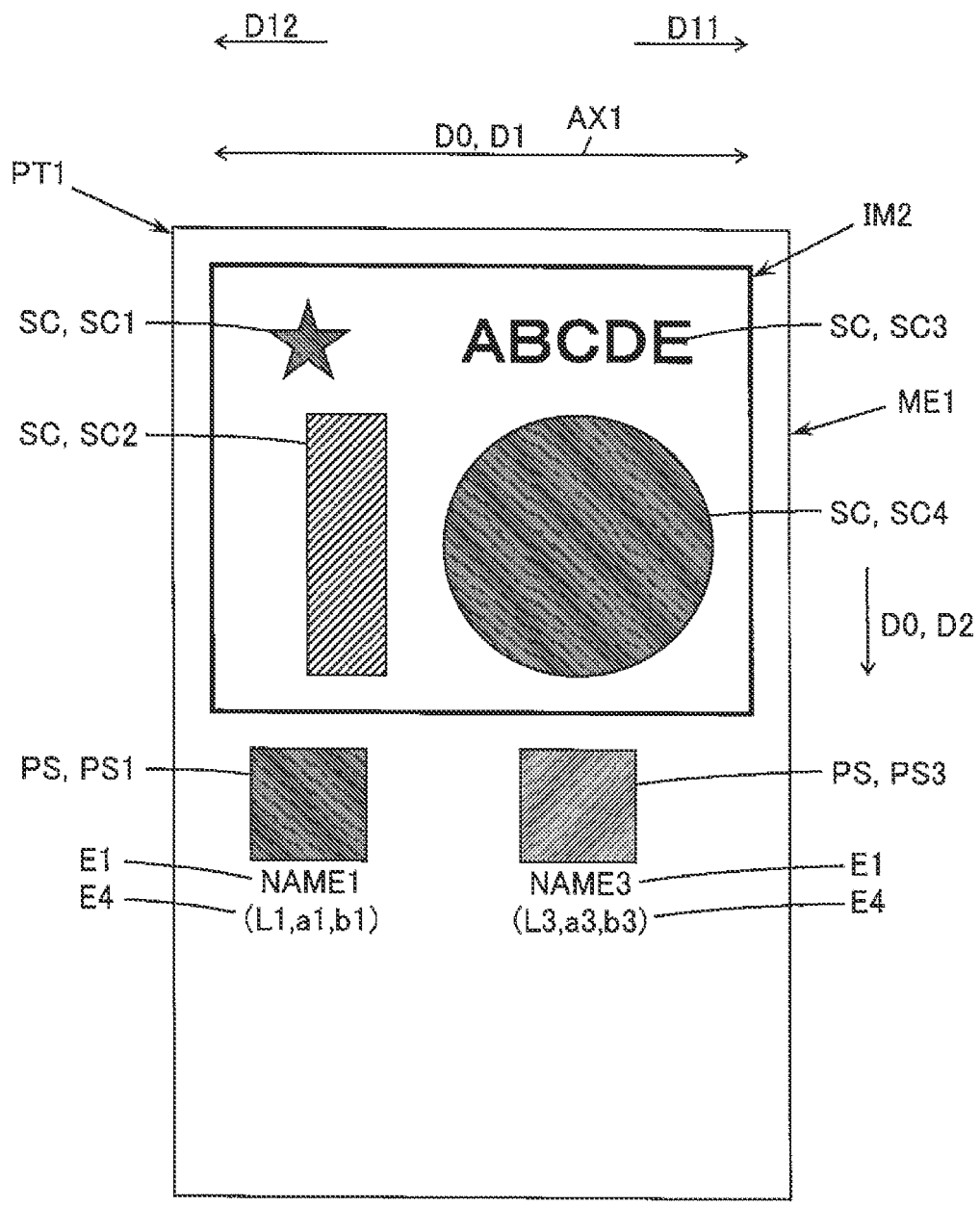
FIG. 14 is a diagram schematically showing another example of the print object including the print image and the special color patch.

Aspect 5:

As illustrated in FIG. 12 through FIG. 14, it is possible for the processing section 11 to make a display section (20) display a list 220 of the special colors included in the print target image IM1, receive pointing of the special color patch PS to be printed out of the list 220, or make the printing device (40) perform printing of the special color patch PS pointing of which has been received. In the present aspect, since it is possible for the user to instruct whether to print the special color SC included in the print target image IM1 as the special color patch PS, it is possible to enhance the convenience.

Aspect 6:

As illustrated in FIG. 4, when the use area of the special color SC included in the print image IM2 is smaller than a predetermined size, it is possible for the processing section 11 to make the size of the special color patch PS larger than the use area of the special color SC. In the present aspect, since the size of the special color patch PS is larger than the use area of the special color SC even though the use area of the special color SC included in the print image IM2 is small, it is easy to perform the colorimetry of the special color SC. Therefore, it is possible for the present aspect to provide an appropriate example of suppressing the degradation in accuracy of the color matching of the special color.

Figure 15:
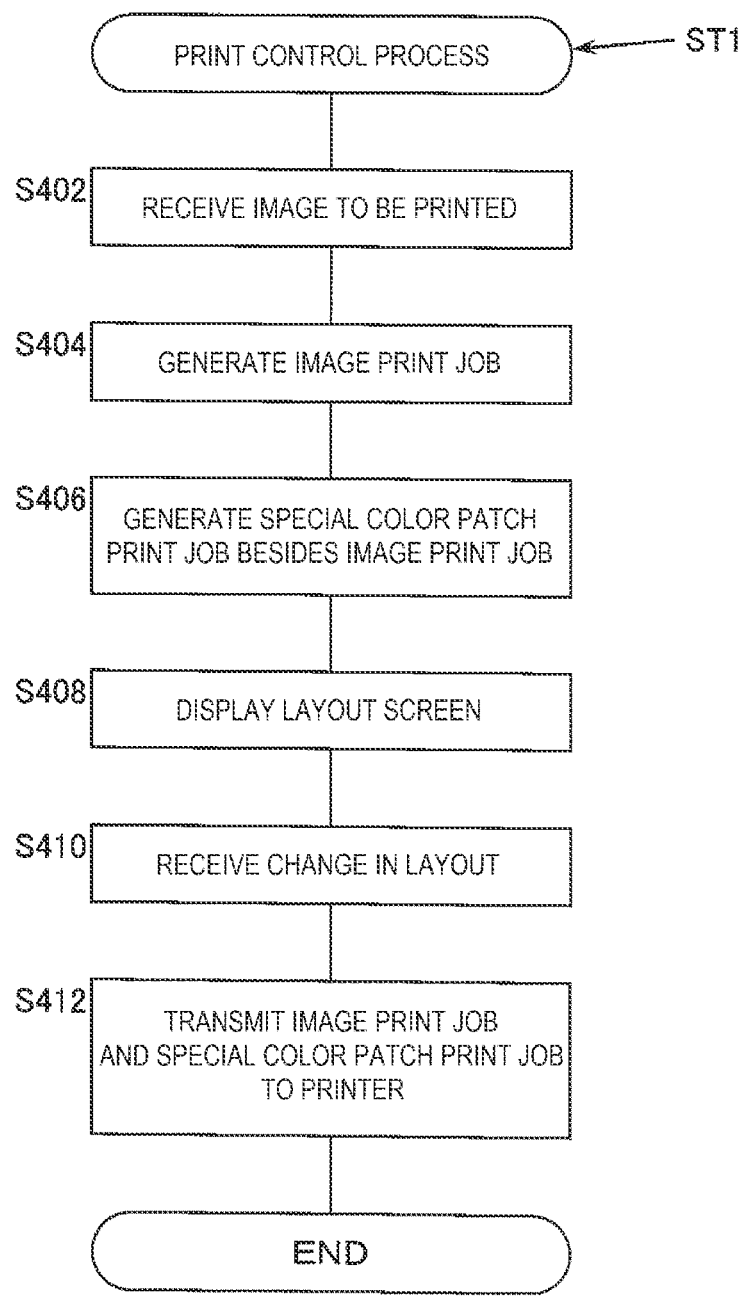
FIG. 15 is a flowchart showing another example of the print control process performed by the information processing device.
Figure 16:
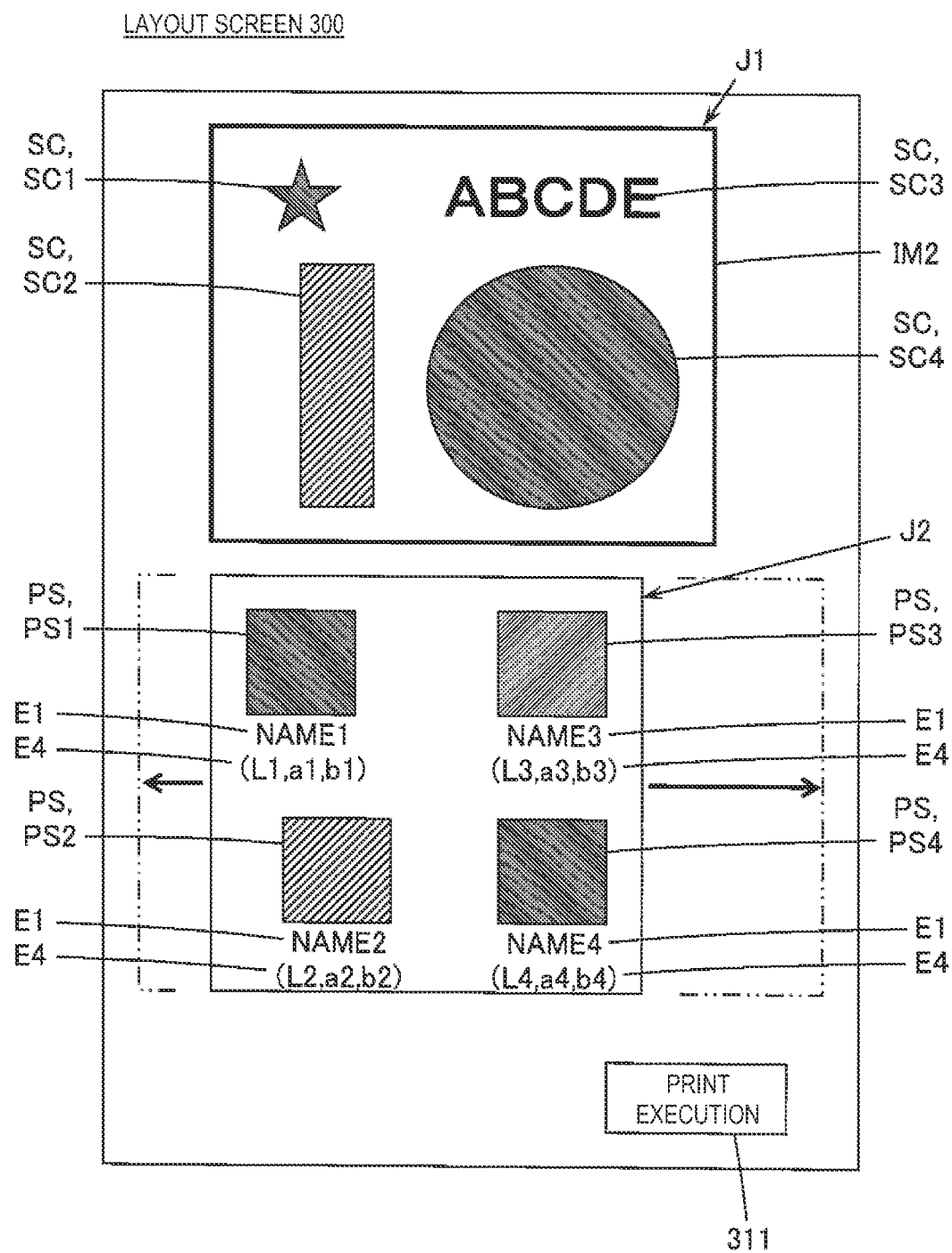
FIG. 16 is a diagram schematically showing an example of a layout screen.

Aspect 7:

As illustrated in FIG. 15 and FIG. 16, it is possible for the processing section 11 to generate an image print job J1 of making the print image IM2 be printed based on the print target image IM1. It is possible for the processing section 11 to generate a special color patch print job J2 of making the special color patches PS be printed based on the special color data DS. It is also possible for the processing section 11 to make the display section (20) display a layout screen 300 representing a layout of the image print job J1 and the special color patch print job J2 to the print target object ME1. It is possible for the processing section 11 to receive a change in the layout, and then pass the image print job J1 and the special color patch print job J2 to the printing device (40). It is possible for the processing section 11 to set the print image IM2 and the special color patches PS in the layout the change in which has been received.

In the aspect described above, since it is possible for the user to easily perform the layout of the print image IM2 and the special color patches PS, it is possible to reduce the printing, and it is possible to efficiently make the print image IM2 and the special color patches PS be printed. As a result, it is possible for the aspect described above to reduce the cost related to the printing.

Figure 5:
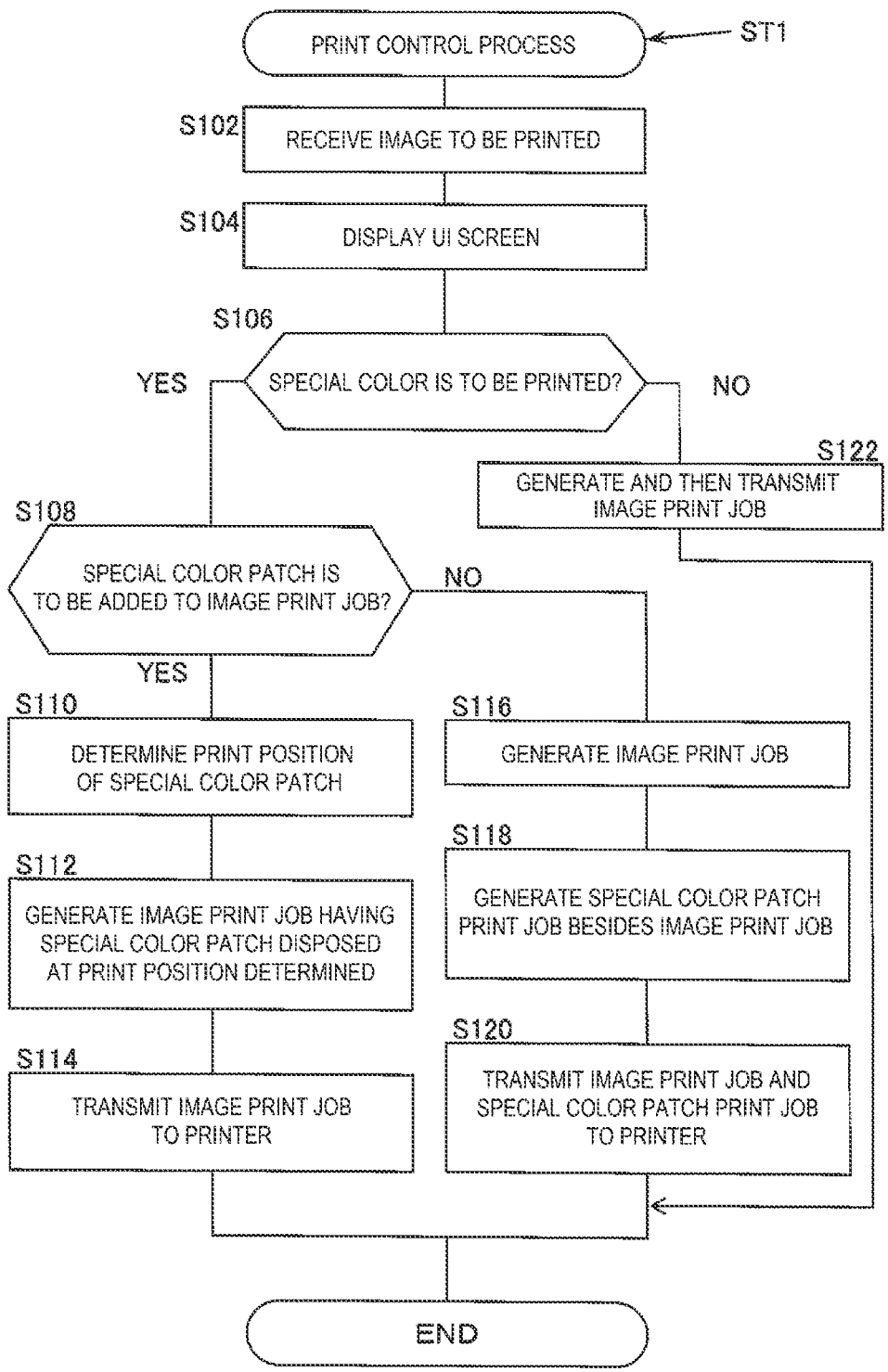
FIG. 5 is a flowchart showing an example of a print control process performed by an information processing device.
Figure 11:
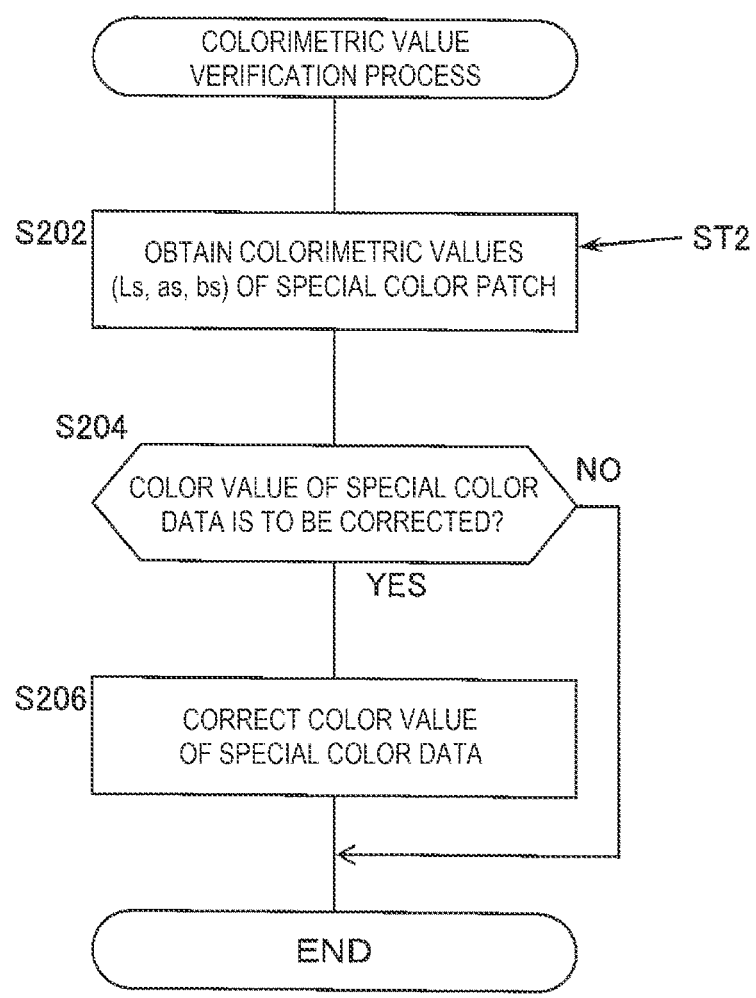
FIG. 11 is a flowchart showing an example of a colorimetric value verification process performed by the information processing device.

Aspect 8:

Incidentally, as illustrated in FIG. 5, FIG. 11 and the like, a processing method according to an aspect of the present technology is a processing method of verifying the special color SC included in the print image IM2, and includes a print control step ST1 and a colorimetric value acquisition step ST2. In the present processing method, the printing device (40) is made to print the special color patch PS as the color patch of the special color SC included in the print target image IM1 based on the special color data DS representing the special color SC included in the print target image IM1 in the print control step ST1. In the present processing method, the colorimetric value of the special color patch PS is obtained in the colorimetric value acquisition step ST2. In the present processing method, based on the print target image IM1 and the special color data DS, the printing device (40) is further made to perform printing of the special color patch PS in accordance with the output of the print image IM2 based on the print target image IM1 in the print control step ST1. Therefore, it is also possible for the present aspect to suppress the degradation in accuracy of the color matching of the special color.

Aspect 9:

Further, as illustrated in FIG. 1, in a non-transitory computer-readable storage medium storing a processing program PR0 according to an aspect of the present technology, the processing program PR0 is a program for verifying the special color SC included in the print image IM2, and makes a computer (e.g., the information processing device 10) realize a print control function FU1 and a colorimetric value acquisition function FU2. In the print control function FU1, the printing device (40) is made to print the special color patch PS as the color patch of the special color SC included in the print target image IM1 based on the special color data DS representing the special color SC included in the print target image IM1. In the colorimetric value acquisition function FU2, the colorimetric value of the special color patch PS is obtained. Further, in the print control function FU1, based on the print target image IM1 and the special color data DS, the printing device (40) is made to perform printing of the special color patch PS in accordance with the output of the print image IM2 based on the print target image IM1. Therefore, it is also possible for the present aspect to suppress the degradation in accuracy of the color matching of the special color.

Further, the present technology can be applied to an information processing system including the information processing device, a method of controlling the information processing system, a control program for the information processing system, a non-transitory computer-readable storage medium storing any of the programs described above, and so on. It is possible for the information processing device and the information processing system to be constituted by a plurality of distributed parts.

(2) SPECIFIC EXAMPLE OF INFORMATION PROCESSING SYSTEM

FIG. 1 schematically illustrates a configuration of an information processing system SY1 including the information processing device 10. The information processing system SY1 shown in FIG. 1 includes the information processing device 10, a display device 20 as an example of the display section, the printer 40 as an example of the printing device, and a colorimetric device 80.

The information processing device 10 shown in FIG. 1 is provided with a CPU 12 as a processor, a ROM 13 as a semiconductor memory, a RAM 14 as a semiconductor memory, the storage device 15 as an example of the storage section, an input device 16, and a communication interface 17. Here, the CPU is an abbreviation of Central Processing Unit, the ROM is an abbreviation of Read Only Memory, the RAM is an abbreviation of Random Access Memory, and I/F shown in FIG. 1 is an abbreviation of an interface. The processing program PR0 for making the computer function as the information processing device 10 is stored in the storage device 15, then retrieved by the CPU 12 in the RAM 14, and then executed by the CPU 12. A plurality of functions which the processing program PR0 makes the information processing device 10 perform includes the print control function FU1 and the colorimetric value acquisition function FU2. The CPU 12 executes the processing program PR0 while using the RAM 14 as a work area to thereby make the information processing device 10 realize the functions FU1, FU2 and the like to perform a variety of types of processing. The CPU 12, the ROM 13, and the RAM 14 in which the processing program PR0 is stored are an example of the processing section 11. The processor constituting the processing section 11 is not limited to the single CPU, but can also be a plurality of CPUs, a hardware circuit such as an ASIC, a combination of the CPU and the hardware circuit, or the like. Here, the ASIC is an abbreviation of Application Specific Integrated Circuit.

The storage device 15 stores print target image data DA1 and a color profile 30 illustrated in FIG. 3 besides the processing program PR0. The print target image data DA1 includes the print target image IM1 including the special color SC which is a special color such as a corporate color, and the special color data DS representing the special color SC. The color profile 30 includes a color conversion table 31 representing a correspondence relationship between coordinate values in a device independent color space and coordinate values in a device dependent color space. In the device independent color space, there is usually used the CIE L*a*b* color space, but the CIE XYZ color space or the like can also be used. Here, CIE is an abbreviation of The International Commission on Illumination. Hereinafter, description of "*" will be omitted. When the color profile 30 is a print profile representing a color reproduction characteristic of the printer 40, the CMYK color space, the CMY color space, or the like is used as the device dependent color space. Here, the character C means cyan, the character M means magenta, the character Y means yellow, and the character K means black. The color conversion table 31 included in the print profile represents a correspondence relationship between, for example, coordinate values in the Lab color space and recording material values each corresponding to an amount of ink used. As the color profile 30, there can be used, for example, a data format of the ICC profile. Here, ICC is an abbreviation of the International Color Consortium. As the storage device 15, there can be used a semiconductor memory such as a flash memory, a magnetic recording medium such as a hard disk drive, or the like. When the storage device 15 stores the processing program PR0, the storage device 15 becomes a computer-readable medium storing the processing program PR0.

As the input device 16, there can be used a pointing device, hard keys including a keyboard, a touch panel attached to a surface of a display panel, or the like. The communication interface 17 is coupled to a communication interface 44 of the printer 40 wirelessly or with wire to input/output information such as print data from/to the printer 40. The connection between the communication interfaces 17, 44 can be local connection such as USB connection or near field communication connection, or can also be network connection such as LAN or the Internet. Here, USB is an abbreviation of Universal Serial Bus, and LAN is an abbreviation of Local Area Network.

It should be noted that the information processing device 10 includes a computer such as a personal computer including a tablet terminal. For example, when applying a main body of a desktop personal computer as the information processing device 10, generally, the display device 20, the printer 40, and the colorimetric device 80 are coupled to the main body. When applying a computer integrated with a display device such as a laptop personal computer as the information processing device 10, generally, the printer 40 and the colorimetric device 80 are coupled to the computer. A host device integrated with a display device is the same in outputting display data to the internal display device. Further, the information processing device 10 can have all of the constituents in a single chassis, but can also be constituted by a plurality of devices divided so as to be able to communicate with each other. Further, it is possible to implement the present technology even when at least a part of the printer 40 and the colorimetric device 80 is located inside the information processing device 10.

The display device 20 shown in FIG. 1 receives display data from the information processing device 10, and then performs display on the screen based on the display data. As the display device 20, there can be used a liquid crystal display for performing display on a liquid crystal panel as the screen, an organic EL display (organic electroluminescent display), or the like.

The printer 40 shown in FIG. 1 is an inkjet printer provided with a controller 41, a RAM 43, the communication interface 44, the drive section 50, the recording head 61, and so on. The controller 41, the RAM 43, and the communication interface 44 are made capable of inputting/outputting information from/to each other.

The controller 41 is provided with a CPU 42 for mainly performing information processing and control in the printer 40, and controls an operation of the drive section 50 and the recording head 61 based on a print job stored in the RAM 43 from the information processing device 10 via the communication interface 44. The print job is information representing an instruction of making an image be printed. The controller 41 generates a control signal SG for driving a drive element 63 provided to the recording head 61 based on the print job, and then outputs the control signal SG to a drive circuit 62 provided to the recording head 61. For example, when a certain attention pixel described in the print job is "dot formation," the controller 41 outputs a signal for ejecting a droplet for dot formation to the attention pixel as the control signal SG. The controller 41 can be formed of an SoC or the like, and it is possible for the controller 41 to directly read data as a processing target from the RAM 43 or to directly write data having been processed to the RAM 43. Here, SoC is an abbreviation of System on a Chip. Further, it is possible for the controller 41 to be formed of an ASIC.

The communication interface 44 is coupled to the information processing device 10 to input/output information from/to the information processing device 10. The communication interface 44 stores the print job received from the information processing device 10 into the RAM 43.

The drive section 50 controlled by the controller 41 is provided with a carriage motor 51, a feeding section 53, a carriage 60, and so on. The printer 40 provided with the carriage 60 and so on is a serial printer. The carriage motor 51 moves the carriage 60 toward an outward direction D11 and a return direction D12 opposite to the outward direction D11 via a plurality of gear wheels not shown and a belt 52. Here, the outward direction D11 and the return direction D12 are collectively referred to as the main scanning direction D1. In the description with reference to FIG. 2, the feeding section 53 feeds the print target object ME1 toward a feeding direction D3 opposite to the sub-scanning direction D2 perpendicular to the main scanning direction D1. On the carriage 60, there is mounted the recording head 61 for ejecting ink droplets 67 of, for example, C, M, Y, and K. The recording head 61 is provided with the drive circuit 62, the drive element 63, and so on. The drive circuit 62 applies a voltage signal to the drive element 63 in accordance with the control signal SG input from the controller 41. As the drive element 63, there can be used a piezoelectric element for applying pressure to ink 66 in a pressure chamber communicated with a nozzle 64, a drive element for generating a bubble in the pressure chamber with heat to eject the ink droplet 67 from the nozzle 64, or the like. To the pressure chamber of the recording head 61, there is supplied the ink 66 from the ink cartridge 65. A combination of the ink cartridge 65 and the recording head 61 is provided to each of, for example, C, M, Y, and K. The ink 66 in the pressure chamber is ejected by the drive element 63 from the nozzle 64 toward the print target object ME1 as the ink droplet 67. Thus, a dot of the ink droplet 67 is provided to the print target object ME1 such as printing paper. By repeating an operation in which the dot corresponding to the print job is formed while the recording head 61 moves toward the main scanning direction D1, and then the print target object ME1 is fed toward the feeding direction D3 as much as a single sub-scanning action, the print image IM2 illustrated in FIG. 4 is provided to the print target object ME1.

According to the above, the drive section 50 including the carriage motor 51 moves the print target object ME1 and the recording head 61 relatively to each other in the main scanning direction D1 when the ink droplet 67 to be landed on the print target object ME1 is ejected from the nozzle 64, namely when recording is performed. Further, the drive section 50 including the feeding section 53 moves the print target object ME1 and the recording head 61 relatively to each other in the sub-scanning direction D2 when the ink droplet 67 is not ejected from the nozzle 64, namely when recording is not performed.

The colorimetric device 80 is coupled to, for example, the communication interface 17, performs the colorimetry of such special color patches PS as illustrated in FIG. 4 using an embedded colorimetric sensor, and transmits the colorimetric values thus obtained to the information processing device 10 using an embedded communication interface. The patch is also referred to as a color chip. The colorimetric value is assumed to be a value representing luminosity L and chromaticity coordinates a, b in the Lab color space, but can be a value representing the coordinates X, Y, Z in the XYZ color space or the like. The information processing device 10 receives the colorimetric value from the colorimetric device 80, and performs the colorimetric value verification process illustrated in FIG. 11 based on the colorimetric value.

FIG. 2 schematically illustrates the relative displacement between the print target object ME1 and the recording head 61 using band printing as an example. In the lower part of FIG. 2, there is illustrated the velocity V of the carriage 60 corresponding to a position x in the outward direction D11 when performing the main scanning in which the carriage 60 on which the recording head 61 is mounted moves toward the outward direction D11.

The scanning direction D0 shown in FIG. 2 is a collective term of the main scanning direction D1 and the sub-scanning direction D2.

The recording head 61 shown in FIG. 2 has a nozzle array 61L having a plurality of nozzles 64 arranged in a nozzle arrangement direction D4. Although the nozzle arrangement direction D4 shown in FIG. 2 coincides with the sub-scanning direction D2, it is possible for the nozzle arrangement direction can be shifted within a range smaller than 90° from the sub-scanning direction. Further, the plurality of nozzles 64 included in the nozzle array 61L can be arranged in a zigzag manner. When the print image IM2 is a color image, the recording head 61 can be provided with, for example, a nozzle array including a plurality of nozzles for ejecting ink droplets of C, a nozzle array including a plurality of nozzles for ejecting ink droplets of M, a nozzle array including a plurality of nozzles for ejecting ink droplets of Y, and a nozzle array including a plurality of nozzles for ejecting ink droplets of K. The band printing means printing of completing the recording of each of areas A1, A2, A3, . . . corresponding to the length of the nozzle array 61L in the sub-scanning direction D2 with a single main scanning action.

In FIG. 2, when performing a first main scanning action, the drive section 50 of the printer 40 moves the recording head 61 throughout the entire width of the print target object ME1 in the outward direction D11 due to the drive of the carriage motor 51. During this period, the controller 41 of the printer 40 makes the recording head 61 appropriately eject the ink droplets 67 in a state in which feeding of the print target object ME1 stops. Thus, recording is performed in a part corresponding to the area A1 out of the print image IM2. When performing a first sub-scanning action, the drive section 50 feeds the print target object ME1 toward the feeding direction D3 as much as a distance in the single feeding action with the drive of the feeding section 53. Based on the print target object ME1, the recording head 61 relatively moves toward the sub-scanning direction D2 as much as the distance in the single feeding action as a result. During the sub-scanning action, the ink droplet 67 to be landed on the print target object ME1 is not ejected from the recording head 61. It should be noted that the ink droplets 67 not to be recorded such as ink droplets used for flashing can be ejected from the recording head 61.

When performing a second main scanning action, the drive section 50 of the printer 40 moves the recording head 61 throughout the entire width of the print target object ME1 in the return direction D12 due to the drive of the carriage motor 51. During this period, the controller 41 of the printer 40 makes the recording head 61 appropriately eject the ink droplets 67 in a state in which feeding of the print target object ME1 stops. Thus, recording is performed in a part corresponding to the area A2 out of the print image IM2. When performing a second sub-scanning action, the drive section 50 feeds the print target object ME1 toward the feeding direction D3 as much as the distance in the single feeding action with the drive of the feeding section 53. During this period, the ink droplet 67 to be landed on the print target object ME1 is not ejected from the recording head 61.

Subsequently, when performing a third main scanning action, recording is performed in the area A3 with the ink droplets 67 ejected from the recording head 61 moving toward the outward direction D11, and when performing a fourth main scanning action via a third sub-scanning action, recording is performed in the area A4 with the ink droplets 67 ejected from the recording head 61 moving toward the return direction D12. Further, when performing a fifth main scanning action via a fourth sub-scanning action, recording is performed in the area A5 with the ink droplets 67 ejected from the recording head 61 moving toward the outward direction D11. In other words, printing is performed by processing units each consisting of the main scanning action in which the recording head 61 moves toward the outward direction D11, the sub-scanning action between the present main scanning action and the subsequent main scanning action, the main scanning action in which the recording head 61 moves toward the return direction D12, and the sub-scanning action between the present main scanning action and the subsequent main scanning action.

It should be noted that the processing unit of a bidirectional printing such as overlap printing in which the areas partially overlap each other, pseudo band printing in which recording in each of the areas is performed with two or more main scanning actions, or interlace printing in which a distance is provided between rasters in which recording is performed with a single main scanning action, and then recording is performed in a raster between those rasters with the main scanning action performed later is substantially the same as the processing unit of the band printing. In the case of unidirectional printing, recording is not performed when the recording head 61 moves toward the return direction D12.

The recording head 61 is accelerated from an initial position x0 to a position x1 where constant velocity Vc is achieved, then keeps the constant velocity Vc from the position x1 to a deceleration start position x2, and is then decelerated from the deceleration start position x2 to a stop position x3 where the velocity of 0 is achieved. In the printer 40 shown in FIG. 2, it is assumed that recording is performed not only in a period in which the velocity of the recording head 61 is at the constant velocity Vc, but also in a period in which the recording head 61 is accelerated or decelerated in order to reduce the print time as short as possible. Therefore, the area A5 shown in FIG. 2 includes an acceleration area 71 in which recording is performed while the recording head 61 is accelerated, a constant-velocity area 72 in which recording is performed while the recording head 61 is moving at the constant velocity Vc, and a deceleration area 73 in which recording is performed while the recording head 61 is decelerated.

FIG. 3 schematically illustrates a structure of the print target image data DA1 stored in the storage device 15 of the information processing device 10.

The print target image IM1 included in the print target image data DA1 shown in FIG. 3 includes a plurality of special colors SC1 through SC4. It should be noted that the special color SC is a collective term of the special colors SC1 through SC4. In FIG. 3, the first special color SC1 corresponds to a star shape, the second special color SC2 corresponds to a rectangular shape, the third special color SC3 corresponds to characters, and the fourth special color SC4 corresponds to a circular shape. It should be noted that the first, second, third, and fourth special colors selected from a plurality of special colors are relatively decided. Therefore, it is possible to apply the special color SC3 to the first special color, and at the same time, apply the special color SC4 to the second special color.

The special color data DS1, DS2, DS3, and DS4 included in the print target image data DA1 shown in FIG. 3 respectively represent the special colors SC1, SC2, SC3, and SC4. It should be noted that the special color data DS is a collective term of the special color data DS1 through DS4. Each of the special color data DS includes a mane E1 of the special color SC, a shape E2 of the special color SC, a position E3 of the special color SC in the print target image IM1, and color values E4 of the special color SC. The position E3 of the special color SC is represented by, for example, a start coordinate and an end coordinate of the shape E2 of the special color SC. The position E3 shown in FIG. 3 is represented by an x coordinate corresponding to the position in the main scanning direction D1, and a y coordinate corresponding to the position in the sub-scanning direction D2. The color values E4 are represented by, for example, Lab values as the coordinate values in the Lab color space.

FIG. 4 schematically illustrates a print object PT1 generated from the print target image data DA1. The print object PT1 includes the print image IM2 based on the print target image IM1, and the special color patches PS1, PS2, PS3, and PS4 respectively based on the special color data DS1, DS2, DS3, and DS4 disposed on the print target object ME1. It should be noted that the special color patch PS is a collective term of the special color patches PS1 through PS4. For the sake of description easy to understand, the special color patches PS are described in an exaggerated manner with respect to the print image IM2 in FIG. 4.

The print image IM2 formed of the print target image IM1 includes the special colors SC1 through SC4.

The special color patches PS1, PS2, PS3, and PS4 are respectively the color patches of the special colors SC1, SC2, SC3, and SC4. The names E1 and the color values E4 shown in FIG. 3 are provided to the respective special color patches PS. The color values E4 shown in FIG. 4 are Lab values, but the color values to be attached to the special color patch PS can also be CMYK values, RGB values, or the like converted in accordance with the color profile 30. Here, the character R means red, the character G means green, and the character B means blue.

Incidentally, when continuously printing the image including the special color SC, due to a change in a fuselage, equipment, or a print target object ME1, the special color SC becomes different in hue from the past in some cases. Therefore, the user performs the colorimetry of the special color SC to thereby quantitatively verify the fact that the color of the special color SC has not changed.

Here, when printing of the special color patch according to the output of the print image is not performed, there arises the following problem.

First, in order to verify where in the print object the special color is used, it is necessary for the user to search for the special color while visually comparing the special color with a comprehensive layout diagram or a printing app screen. This operation takes a lot of trouble.

Further, when similar colors to the special color are arranged close to each other, an illusion or a human error is apt to occur when performing the colorimetry of the special color.

Further, when the area of the special color is small, or has gradation, degradation of the colorimetric accuracy is apt to be incurred.

In addition, when the print object is large in size, the hue is difficult to verify in some cases depending on the print position.

In the present specific example, it is assumed that the printing of the special color patches PS is performed in accordance with the output of the print image IM2. Thus, it becomes possible to tell the output position of the special color SC just by looking, and it is possible to reduce a human error when performing the colorimetry. Further, when the area of the special color SC in the print image IM2 is small or has gradation, by the special color being printed large in size using the special color patch PS, the colorimetry becomes easy, and the degradation in colorimetric accuracy becomes difficult to occur. As described above, in the present specific example, it is possible to save the effort of color matching of the special color SC, and thus, it is possible to reduce the failure and degradation in accuracy when performing the colorimetry of the special color.

A specific example of performing printing of the special color patches PS in accordance with the output of the print image IM2 will hereinafter be described.

(3) SPECIFIC EXAMPLE OF PROCESSING PERFORMED BY INFORMATION PROCESSING DEVICE

FIG. 5 schematically illustrates a print control process to be performed by the information processing device 10 with the processing section 11 playing a central role. When the user starts up the processing program PR0 shown in FIG. 1, the print control process shown in FIG. 5 starts. The print control process includes processes of steps S102 through S122 corresponding to the print control step ST1, and the print control function FU1. Hereinafter, the description of "step" will be omitted, and the reference symbol of each step will be described in parentheses. The information processing device 10 executes a plurality of processes in parallel to each other due to multitasking.

Figure 6:
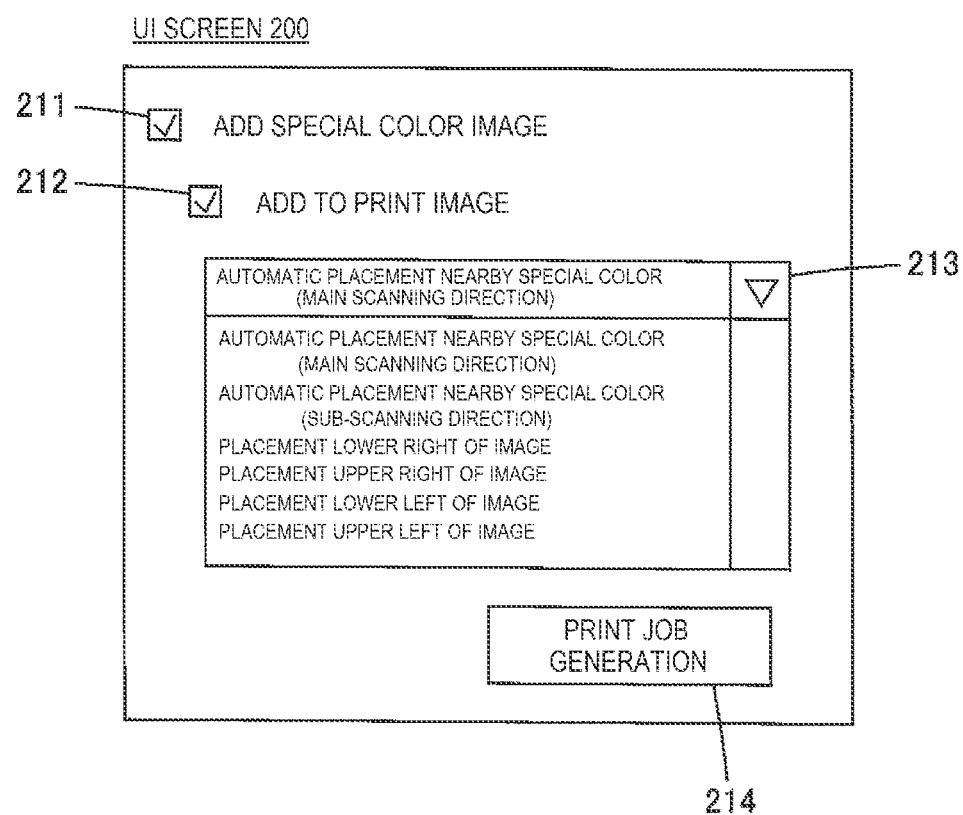
FIG. 6 is a diagram schematically showing an example of a user interface screen.

When the print control process starts, the processing section 11 receives (S102) an operation of designating the print target image IM1 as an image to be printed, in cooperation with the input device 16. On this occasion, it is possible for the processing section 11 to make the display device 20 display the print target image IM1. Subsequently, the processing section 11 makes the display device 20 display (S104) such a UI screen 200 as illustrated in FIG. 6. The term UI is an abbreviation of user interface.

The UI screen 200 shown in FIG. 6 has checkboxes 211, 212, a placement selection field 213 for the special color patches PS, and a print job generation button 214. When the checkboxes 211, 212 are operated, the information processing device 10 attaches a check mark when the check mark is absent, and remove the check mark when the check mark is present.

The checkbox 211 is an operation element for adding an image of the special color patch PS to the display screen of the display device 20. When the check mark is present in the checkbox 211, the image of the special color patch PS is added to the display screen, and the special color patch PS is printed by the printer 40 on the print target object ME1. When the check mark is absent from the checkbox 211, the image of the special color patch PS is not added to the display screen, and the special color patch PS is not printed.

Figure 9:
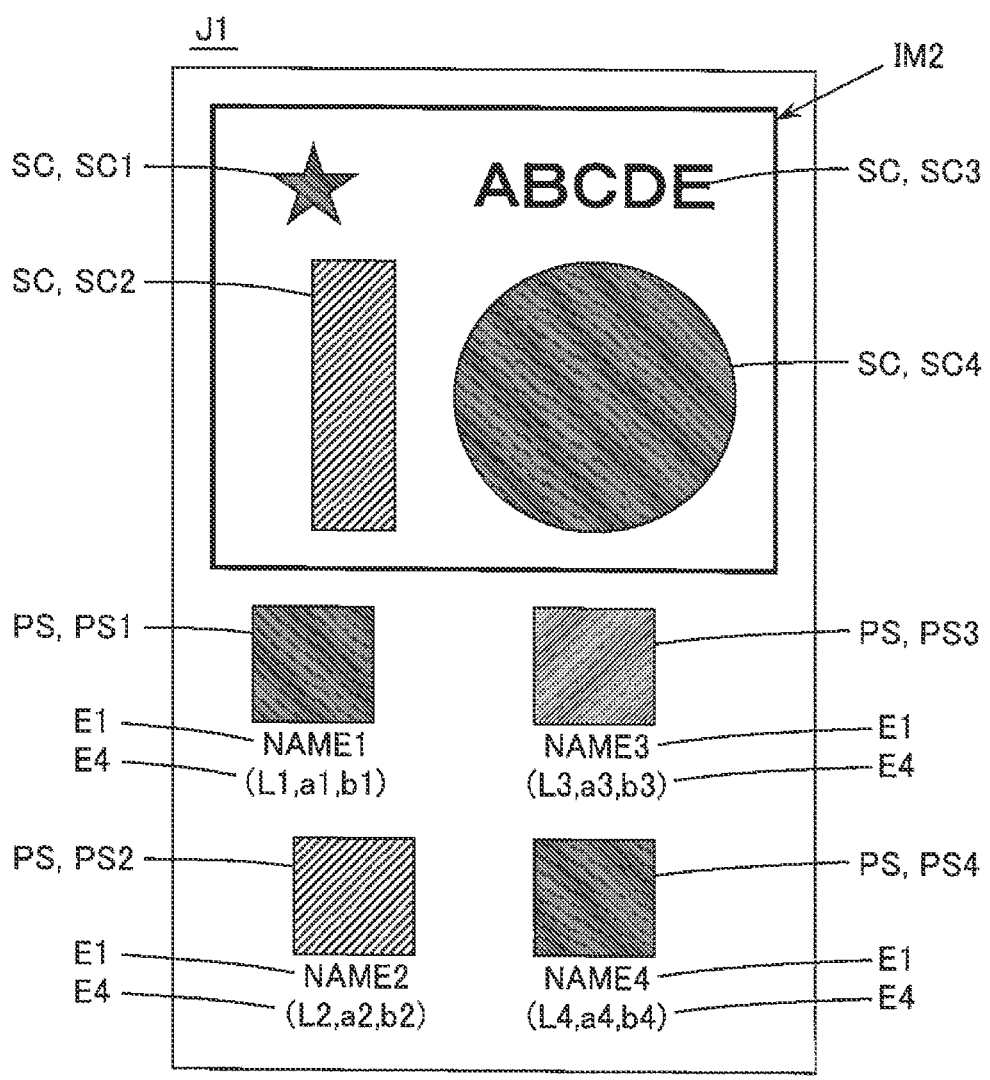
FIG. 9 is a diagram schematically showing a configuration example of an image print job including a special color patch.
Figure 10:
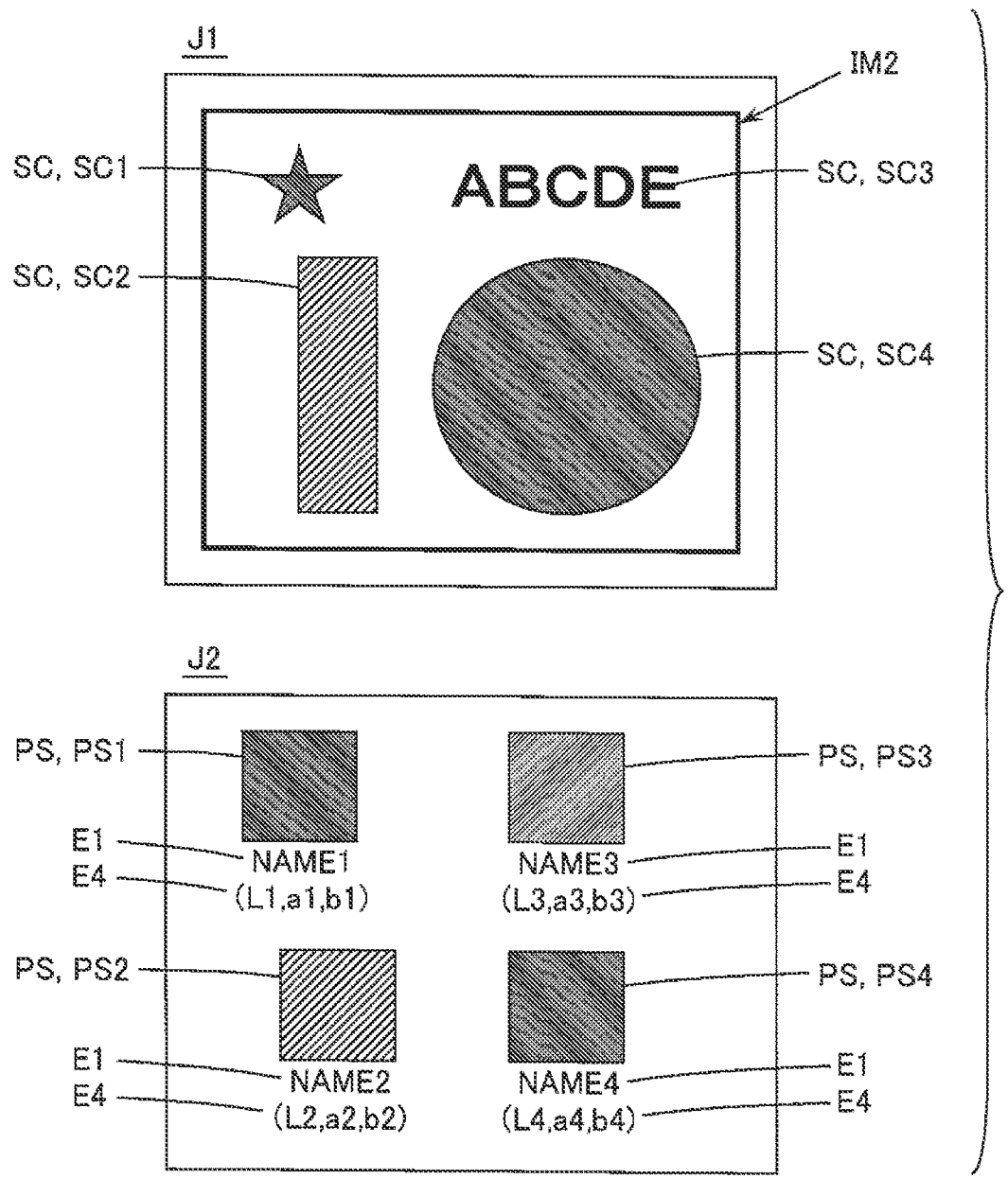
FIG. 10 is a diagram schematically showing an example in which the image print job and a special color patch print job are separated from each other.

The checkbox 212 is an operation element for adding the special color patches PS to the image print job J1 as illustrated in FIG. 9, and can be operated only when the check mark is present in the checkbox 211, and is made inoperable when the check mark is absent from the checkbox 211. The image print job J1 is a print job for printing the print image IM2. When the check mark is present in the checkbox 212, the special color patches PS are added to the image print job J1. When the check mark is absent from the checkbox 212, the special color patch print job J2 is generated besides the image print job J1 as illustrated in FIG. 10. The special color patch print job J2 is a print job for printing the special color patch PS.

The placement selection field 213 is an operation element for selecting the placement of the special color patch PS, and can be operated only when the check mark is present in the checkbox 212, and is made inoperable when the check mark is absent from the checkbox 212. In the placement selection field 213 shown in FIG. 6, it is possible to select any one of the placement items of "AUTOMATIC PLACEMENT NEARBY SPECIAL COLOR (MAIN SCANNING DIRECTION)," "AUTOMATIC PLACEMENT NEARBY SPECIAL COLOR (SUB-SCANNING DIRECTION)," "PLACEMENT LOWER RIGHT OF IMAGE," "PLACEMENT UPPER RIGHT OF IMAGE," "PLACEMENT LOWER LEFT OF IMAGE," and "PLACEMENT UPPER LEFT OF IMAGE." The information processing device 10 receives an operation of selecting any one of the placement items among the plurality of the placement items with the input device 16. In each of the placement items, the printing arrangement of the special color patch PS is determined as illustrated in FIG. 7.

Figure 7:
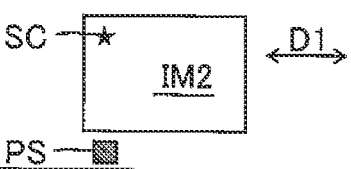
FIG. 7 is a diagram schematically showing an example of a print position of the special color patch.
Figure 7:
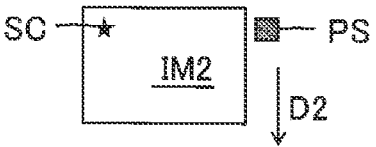
Figure 7:
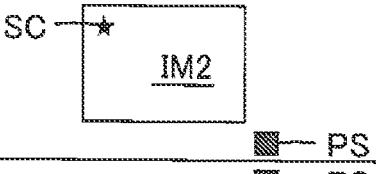
Figure 7:
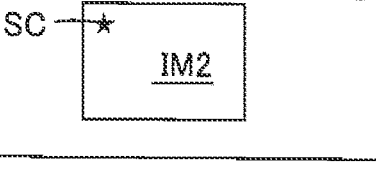
Figure 7:
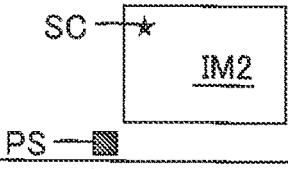
Figure 7:
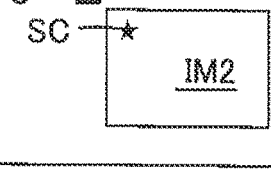

FIG. 7 schematically illustrates the print position of the special color patch PS for each of the placement items.

"AUTOMATIC PLACEMENT NEARBY SPECIAL COLOR (MAIN SCANNING DIRECTION)" is the placement item for aligning the position of the special color patch PS with the position of the special color SC included in the print image IM2 in the main scanning direction D1. Aligning the position of the special color patch PS with the position of the special color SC in the main scanning direction D1 is matching the coordinate in the main scanning direction D1 of the special color patch PS with the coordinate in the main scanning direction D1 of the special color SC on the assumption that the coordinate in the sub-scanning direction D2 of the special color patch PS is different from the coordinate in the sub-scanning direction D2 of the special color SC. In the description with reference to FIG. 4, matching the position of the special color patch PS with the position of the special color SC in the main scanning direction D1 means that it is arranged that when projecting the special color patch PS and the special color SC to an imaginary axis AX1 extending along the main scanning direction D1, the projection position of the special color patch PS and the projection position of the special color SC are aligned with each other. For example, FIG. 4 shows the state in which the position of the first special color patch PS1 is aligned with the position of the first special color SC1 in the main scanning direction D1.

"AUTOMATIC PLACEMENT NEARBY SPECIAL COLOR (SUB-SCANNING DIRECTION)" is the placement item for aligning the position of the special color patch PS with the position of the special color SC included in the print image IM2 in the sub-scanning direction D2. Aligning the position of the special color patch PS with the position of the special color SC in the sub-scanning direction D2 is matching the coordinate in the sub-scanning direction D2 of the special color patch PS with the coordinate in the sub-scanning direction D2 of the special color SC on the assumption that the coordinate in the main scanning direction D1 of the special color patch PS is different from the coordinate in the main scanning direction D1 of the special color SC. In other words, matching the position of the special color patch PS with the position of the special color SC in the sub-scanning direction D2 means that it is arranged that when projecting the special color patch PS and the special color SC to an imaginary axis extending along the sub-scanning direction D2, the projection position of the special color patch PS and the projection position of the special color SC are aligned with each other.

"PLACEMENT LOWER RIGHT OF IMAGE" is the placement item for setting the print position of the special color patch PS to lower right of the print image IM2.

"PLACEMENT UPPER RIGHT OF IMAGE" is the placement item for setting the print position of the special color patch PS to upper right of the print image IM2.

"PLACEMENT LOWER LEFT OF IMAGE" is the placement item for setting the print position of the special color patch PS to lower left of the print image IM2.

"PLACEMENT UPPER LEFT OF IMAGE" is the placement item for setting the print position of the special color patch PS to upper left of the print image IM2.

When the processing section 11 receives the operation of the print job generation button 214 shown in FIG. 6 in cooperation with the input device 16, the processing section 11 performs the processes in S106 and the subsequent steps shown in FIG. 5. First, based on the state of the checkbox 211, the processing section 11 determines (S106) whether to print the special color patch PS. When the check mark is present in the checkbox 211, based on the state of the checkbox 212, the processing section 11 determines (S108) whether to add the special color patch PS to the image print job J1. When the check mark is present in the checkbox 212, based on the placement item having been received in the placement selection field 213, the processing section 11 determines (S110) the print position of the special color patch PS.

The print position determination process in S110 is performed in, for example, the following manner.

When the placement item is "AUTOMATIC PLACEMENT NEARBY SPECIAL COLOR (MAIN SCANNING DIRECTION)," it is sufficient for the processing section 11 to perform processing of matching the coordinate in the main scanning direction D1 of the special color patch PS with the coordinate in the main scanning direction D1 of the special color SC below or above the print image IM2. Then, as shown in FIG. 4 and FIG. 7, the print position of each of the special color patches PS is aligned with the position of the corresponding special color SC in the main scanning direction D1. When there is an overlap between the print range of a certain special color patch PS and the print range of another special color patch PS in the main scanning direction D1, it is sufficient for the processing section 11 to perform processing of shifting the coordinates so that the print ranges do not overlap each other in the sub-scanning direction D2 perpendicular to the main scanning direction D1. For example, FIG. 4 shows the state in which there is an overlap between a print range R1 of the first special color patch PS1 and a print range R2 of the second special color patch PS2 in the main scanning direction D1. In this case, processing of shifting the coordinate in the sub-scanning direction D2 to a coordinate representing a lower position or a higher position than the position of the first special color patch PS1 while keeping the coordinate in the main scanning direction D1 is performed on the second special color patch PS2 by the processing section 11. Although the print ranges R1, R2 partially overlap each other in the main scanning direction D1, the processing of shifting the coordinates in the sub-scanning direction D2 is also performed by the processing section 11 on the special color patches PS3, PS4 having the respective print ranges completely coincide with each other in the main scanning direction D1.

When the placement item is "AUTOMATIC PLACEMENT NEARBY SPECIAL COLOR (SUB-SCANNING DIRECTION)," it is sufficient for the processing section 11 to perform processing of matching the coordinate in the sub-scanning direction D2 of the special color patch PS with the coordinate in the sub-scanning direction D2 of the special color SC at the right side or the left side of the print image IM2. Then, as shown in FIG. 7, the print position of each of the special color patches PS is aligned with the position of the corresponding special color SC in the sub-scanning direction D2. When there is an overlap between the print range of a certain special color patch PS and the print range of another special color patch PS in the sub-scanning direction D2, it is sufficient for the processing section 11 to perform processing of shifting the coordinates so that the print ranges do not overlap each other in the main scanning direction D1 perpendicular to the sub-scanning direction D2. Here, taking the print image IM2 shown in FIG. 4 as an example, the color patch of the special color SC1 is defined as the first special color patch, and the color patch of the special color SC3 is defined as the second special color patch. In this case, there occurs an overlap in the main scanning direction D1 between the print range of the first special color patch and the print range of the second special color patch. Processing of shifting the coordinate in the main scanning direction D1 to a coordinate representing a right side position or a left side position of the position of the first special color patch while keeping the coordinate in the sub-scanning direction D2 is performed on the second special color patch by the processing section 11.

When the placement item is "PLACEMENT LOWER RIGHT OF IMAGE," it is sufficient for the processing section 11 to perform processing of setting the coordinate of the special color patch PS to a coordinate representing a position lower right of the print image IM2 in the outside of the print image IM2. Then, as shown in FIG. 7, the print position of the special color patch PS becomes at the lower right side of the print image IM2.

When the placement item is "PLACEMENT UPPER RIGHT OF IMAGE," it is sufficient for the processing section 11 to perform processing of setting the coordinate of the special color patch PS to a coordinate representing a position upper right of the print image IM2 in the outside of the print image IM2. Then, as shown in FIG. 7, the print position of the special color patch PS becomes at the upper right side of the print image IM2.

When the placement item is "PLACEMENT LOWER LEFT OF IMAGE," it is sufficient for the processing section 11 to perform processing of setting the coordinate of the special color patch PS to a coordinate representing a position lower left of the print image IM2 in the outside of the print image IM2. Then, as shown in FIG. 7, the print position of the special color patch PS becomes at the lower left side of the print image IM2.

When the placement item is "PLACEMENT UPPER LEFT OF IMAGE," it is sufficient for the processing section 11 to perform processing of setting the coordinate of the special color patch PS to a coordinate representing a position upper left of the print image IM2 in the outside of the print image IM2. Then, as shown in FIG. 7, the print position of the special color patch PS becomes at the upper left side of the print image IM2.

After deciding the print position of the special color patch PS, the processing section 11 generates (S112 in FIG. 5) the image print job having the special color patch PS disposed at the print position thus decided. Here, as shown in FIG. 3, the color values E4 of the special color data DS representing the special color SC are Lab values. In contrast, the color values in the CMYK color space depending on the printer 40 are CMYK values. Therefore, the processing section 11 refers to such a color conversion table 31 as illustrated in FIG. 8 to thereby convert the color values E4 of the special color data DS into CMYK values to generate data of the special color patch PS included in such an image print job J1 as illustrated in FIG. 9 based on the CMYK values. Further, when the pixel values of the print target image IM1 are Lab values, the processing section 11 refers to the color conversion table 31 to thereby convert the pixel values of the print target image IM1 into the CMYK values to generate the data of the print image IM2 included in the image print job J1 based on the CMYK values. When the pixel values of the print target image IM1 are RGB values, it is possible for the processing section 11 to generate the data of the print image IM2 using the method described above by referring to a color conversion table representing a correspondence relationship between the coordinate values in the RGB color space and the coordinate values in the Lab color space to thereby convert the pixel values of the print target image IM1 into the Lab values.

FIG. 8 schematically illustrates a structure of the color conversion table 31 included in the color profile 30 as the print profile. The color conversion table 31 has data representing a correspondence relationship between chromatic values ($L_{gi}$, $a_{gi}$, $b_{gi}$) as coordinate values in the Lab color space, and recording material values ($C_i$, $M_i$, $Y_i$, $K_i$) each corresponding to an amount of ink used. Here, a variable i is a variable for identifying n grid points set in an imaginary Lab color space. Here, the number n of grid points is an integer representing a plural number. It is assumed that the plurality of grid points of the color conversion table 31 is arranged in the Lab color space at substantially regular intervals in an a-axis direction, a b-axis direction, and an L-axis direction. When the Lab values as the input values are the chromatic values ($L_{gi}$, $a_{gi}$, $b_{gi}$), the processing section 11 sets the recording material values ($C_i$, $M_i$, $Y_i$, $K_i$) made to correspond to the chromatic values ($L_{gi}$, $a_{gi}$, $b_{gi}$) in the color conversion table 31 to the CMYK values as output values. When the Lab values as the input values do not exist in the chromatic values of the color conversion table 31, it is possible for the processing section 11 to convert the Lab values into the CMYK values due to an interpolation operation using the recording material values ($C_i$, $M_i$, $Y_i$, $K_i$) which are made to correspond to the plurality of grid points surrounding the Lab values.

FIG. 9 schematically illustrates the configuration of the image print job J1 including the special color patches PS. The image print job J1 shown in FIG. 9 is information representing an instruction of making the printer 40 print the image in which the print image IM2 and the special color patches PS are assigned. The processing section 11 performs processing of generating the print image IM2 in the image print job J1 based on the print target image IM1, generating the special color patches PS in the image print job J1 based on the special color data DS, and disposing the special color patches PS at the print positions decided in S110. Further, the processing section 11 performs processing of providing the names E1 and the color values E4 shown in FIG. 3 to the respective special color patches PS.

Further, when the use area of the special color SC included in the print image IM2 is smaller than a predetermined size, the processing section 11 makes the size of the special color patch PS larger than the use area of the special color SC. For example, when the area of the use area of the special color SC is smaller than a threshold value as a predetermined size in the print image IM2 shown in FIG. 9, the processing section 11 performs processing of generating the special color patch PS in the image print job J1 so that the area of the special color patch PS becomes the area corresponding to the threshold value described above. For example, since the area of the use area of the first special color SC1 shown in FIG. 9 is smaller than a threshold value, the size of the first special color patch PS1 as the color patch of the first special color SC1 becomes the area corresponding to the threshold value. In contrast, since the area of the use area of the fourth special color SC4 shown in FIG. 9 is larger than a threshold value, the size of the fourth special color patch PS4 as the color patch of the fourth special color SC4 is suppressed to the area corresponding to the threshold value. Thus, it is possible to make the special color patch PS to have a size with which the colorimetry of the special color patch PS can easily be achieved while preventing the special color patch PS from becoming excessively large in size.

After generating the image print job J1, the processing section 11 transmits (S114 in FIG. 5) the image print job J1 to the printer 40, and then terminates the print control process. The printer 40 having received the image print job J1 forms the print image IM2 and the special color patches PS on the print target object ME1 in accordance with the image print job J1. Then, such a print object PT1 as shown in FIG. 4 can be obtained.

Due to the processes described hereinabove, when the image print job J1 including the special color patches PS is generated, printing of the special color patches PS is performed in accordance with the output of the print image IM2. When the special color patches PS are not printed, when the area of the special color SC included in the print image IM2 is small, or provided with gradation, it is difficult to accurately point the position of the special color SC. When there is an error in the position thus pointed, the accuracy of color matching deteriorates. By performing the printing of the special color patches PS in accordance with the output of the print image IM2, it is possible to surely perform the colorimetry of the special colors SC corresponding to the print image IM2, and thus, it is possible to suppress the colorimetric failure.

In the determination process in S108 shown in FIG. 5, when the check mark is absent from the checkbox 212 shown in FIG. 6, the processing section 11 generates (S116)

such an image print job J1 as illustrated in FIG. 10. The image print job J1 shown in FIG. 10 is information representing an instruction of making the printer 40 print the image in which the print image IM2 is assigned. The image print job J1 shown in FIG. 10 does not include the special color patch PS. The processing section 11 generates the print image IM2 in the image print job J1 based on the print target image IM1. When the pixel values of the print target image IM1 are Lab values, the processing section 11 refers to such a color conversion table 31 as illustrated in FIG. 8 to thereby convert the pixel values of the print target image IM1 into the CMYK values to generate the data of the print image IM2 included in the image print job J1 based on the CMYK values. When the pixel values of the print target image IM1 are RGB values, it is possible for the processing section 11 to generate the data of the print image IM2 using the method described above by referring to a color conversion table representing a correspondence relationship between the coordinate values in the RGB color space and the coordinate values in the Lab color space to thereby convert the pixel values of the print target image IM1 into the Lab values.

After generating the image print job J1, the processing section 11 generates (S118) the special color patch print job J2 for making the special color patches PS be printed separately from the image print job J1 based on the special color data DS shown in FIG. 3. The special color patch print job J2 shown in FIG. 10 is information representing an instruction of making the printer 40 print the image in which the special color patches PS are assigned, and is a print job independent of the image print job J1. The fact that the image print job J1 and the special color patch print job J2 are separated from each other means that the printing process of the printer 40 is separately performed between the image print job J1 and the special color patch print job J2. As described above, the processing section 11 refers to the color conversion table 31 to thereby convert the color values E4 of the special color data DS into the CMYK values to generate data of the special color patch PS included in the special color patch print job J2 based on the CMYK values.

After generating the image print job J1 and the special color patch print job J2, the processing section 11 transmits (S120 in FIG. 5) the image print job J1 and the special color patch print job J2 to the printer 40, and then terminates the print control process. The printer 40 having received the image print job J1 and the special color patch print job J2 forms the print image IM2 on the print target object ME1 in accordance with the image print job J1, and then prints the special color patches PS on the print target object ME1 based on the special color patch print job J2. When the print target object ME1 is cut like a cut form, it is possible for the printer 40 to print the special color patches PS based on the special color patch print job J2 on the print target object different from the print target object on which the print image IM2 is formed based on the image print job J1. When the print target object ME1 is continuing like a paper roll, it is possible for the printer 40 to print the special color patches PS based on the special color patch print job J2 on the print target object on which the print image IM2 is formed based on the image print job J1.

Due to the processes described hereinabove, when the image print job J1 and the special color patch print job J2 are generated separately from each other, printing of the special color patches PS is performed in accordance with the output of the print image IM2. When the special color patches PS are not printed, when the area of the special color SC included in the print image IM2 is small, or provided with gradation, it is difficult to accurately point the position of the special color SC. When there is an error in the position thus pointed, the accuracy of color matching deteriorates. By performing the printing of the special color patches PS in accordance with the output of the print image IM2, it is possible to surely perform the colorimetry of the special colors SC corresponding to the print image IM2, and thus, it is possible to suppress the colorimetric failure.

In the determination process in S106 shown in FIG. 5, when the check mark is absent from the checkbox 211 shown in FIG. 6, the processing section 11 generates only the image print job J1 which does not include the special color patch PS, and then transmits (S122) the image print job J1 to the printer 40. Subsequently, the processing section 11 terminates the print control process. The printer 40 having received the image print job J1 forms the print image IM2 on the print target object ME1 in accordance with the image print job J1.

FIG. 11 schematically illustrates a colorimetric value verification process to be performed by the information processing device 10 with the processing section 11 playing a central role. For example, when the user starts up a colorimetric application program for operating the colorimetric device 80 shown in FIG. 1, the colorimetric value verification process shown in FIG. 11 starts. S202 in the colorimetric value verification process corresponds to the colorimetric value acquisition step ST2 and the colorimetric value acquisition function FU2.

When the colorimetric value verification process starts, the processing section 11 obtains (S202) the colorimetric values (Ls, as, bs) of the special color patch PS from the colorimetric device 80 via the communication interface 17. For example, when the special color patches PS1 through PS4 shown in FIG. 4 are present in the print object PT1, the user performs the colorimetry of each of the special color patches PS1 through PS4 with the colorimetric device 80 as a result. In this case, it is sufficient for the processing section 11 to receive the colorimetric values (Ls, as, bs) obtained for each of the special color patches PS1 through PS4 from the colorimetric device 80 via the communication interface 17. Further, it is also possible for the processing section 11 to make the display device 20 display a screen for receiving input of each of the colorimetric values (Ls, as, bs) to receive the input of each of the colorimetric values (Ls, as, bs) in cooperation with the input device 16. In any case, it is possible to obtain the colorimetric values (Ls, as, bs) of the special color patch PS.

After obtaining the colorimetric values (Ls, as, bs), the processing section 11 branches (S204) the processing in accordance with whether to correct the color values E4 of the special color data DS shown in FIG. 3. This determination process is performed for each of the colorimetric values (Ls, as, bs), and can be the processing of branching the processing in accordance with, for example, whether or not the color difference between the color values E4 and the colorimetric values (Ls, as, bs) is larger than a threshold value. As the color difference, there can be used a color difference $\Delta E_{00}$ expressed by CIEDE 2000 color-difference formula, a color difference $\Delta E^*_{94}$ expressed by CIE 1994 color-difference formula, a color difference $\Delta E^*_{76}$ proposed in 1976 or the like. When the color difference between the color values E4 and the colorimetric values (Ls, as, bs) is no larger than the threshold value, the processing section 11 skips the processing in S206.

When the color difference between the color values E4 and the colorimetric values (Ls, as, bs) is larger than the threshold value, the processing section 11 corrects (S206) the color conversion table 31 of the color profile 30 so that the colorimetric values of the special color patch PS become the color values E4. When describing the processing section 11 with reference to FIG. 8, it is sufficient for the processing section 11 to correct the recording material values (Ci, Mi, Yi, Ki) made to correspond to the chromatic values within a predetermined range from the color values E4 out of the chromatic values (Lgi, agi, bgi) of the color conversion table 31 so that the colorimetric values of the special color patch PS become the color values E4. An amount of correction of each of the recording material values (Ci, Mi, Yi, Ki) can be obtained by simulation, or can be set by receiving the input by the input device 16.

When the processing described above is performed on all of the colorimetric values (Ls, as, bs), the colorimetric value verification process terminates.

Due to the processes in S102 through S120 shown in FIG. 5 described hereinabove, printing of the special color patch PS is performed in accordance with the output of the print image IM2. Thus, it is possible to surely perform the colorimetry of the special color SC corresponding to the print image IM2, and thus, it is possible to prevent the colorimetric failure. Therefore, it is possible for the present specific example to suppress the degradation in accuracy of the color matching of the special color SC. Further, when the position of the special color patch PS is aligned with the position of the special color SC included in the print image IM2 in the scanning direction D0, it is possible to improve the accuracy of the color matching of the special color. When the position of the special color patch PS is aligned with the position of the special color SC included in the print image IM2 in the main scanning direction D1, a difference in color development due to a difference in velocity variation of the recording head 61 when performing the main scanning action is suppressed, and thus, the accuracy in color matching of the special color SC is improved. When the position of the special color patch PS is aligned with the position of the special color SC included in the print image IM2 in the sub-scanning direction D2, a difference in color development due to a difference in relative displacement in the sub-scanning action is suppressed, and thus, the accuracy in color matching of the special color SC is improved. Further, since the position of each of the special color patches PS is aligned with the position of the corresponding special color SC included in the print image IM2 in the scanning direction D0 even when the special colors SC included in the print image IM2 overlap each other in the scanning direction D0, the accuracy in color matching of each of the special colors SC is improved.

In addition, since it is possible to dispose the special color patch PS at a variety of print positions due to the placement selection field 213 shown in FIG. 6, the present information processing device 10 is convenient.

(4) MODIFIED EXAMPLES

A variety of modified examples can be adopted in the present disclosure.

For example, the printing device is not limited to the serial printer, but can be a line printer in which nozzles are arranged throughout the entire width of the print target object. When the print target object ME1 is fed in the feeding direction with respect to the recording head 61 fixed so as not to move in the line printer, the present technology is applied taking the opposite direction to the feeding direction as the scanning direction. Further, the printing device is not limited to the inkjet printer, and can be an electrophotographic printer such as a laser printer using a toner as a recording material, or the like, or can also be a copy machine, a facsimile, a complex machine provided with functions of the copy machine and the facsimile, or the like.

A combination of the types of the recording materials used is not limited to the example described above. For example, the combination of the recording materials can include at least one of light cyan ink lower in color density than C, light magenta ink lower in color density than M, dark yellow ink higher in color density than Y, orange ink, green ink, colorless ink for improving the image quality, and so on.

The processes described above can arbitrarily be modified so that, for example, the order thereof is reversed. For example, in the print control process shown in FIG. 5, it is possible to reverse the process in S116 and the process in S118.

Incidentally, it is preferable to be able to point the special color patch PS from the special colors SC included in the print target image IM1 as illustrated in FIG. 12 and FIG. 13, since an unwanted special color patch is not printed. FIG. 12 shows another example of the print control process performed by the information processing device 10. In the print control process shown in FIGS. 12, S104, S106, and S122 in the print control process shown in FIG. 5 are eliminated, and S302 and S304 are added. The processes in S102, and S108 through S120 are as described in the print control process shown in FIG. 5. FIG. 13 schematically shows another example of the UI screen.

In the print control process shown in FIG. 12, after the process in S102 of receiving an operation of designating the print target image IM1, the processing section 11 makes the display device 20 display (S302) such a UI screen 201 as shown in FIG. 13. The UI screen 201 shown in FIG. 13 has the list 220 of the special colors SC included in the print target image IM1, the checkbox 212, the placement selection field 213 for the special color patches PS, and a special color image addition button 225. The checkbox 212 and the placement selection field 213 are the same as the checkbox 212 and the placement selection field 213 shown in FIG. 6. The list 220 has the names E1 of the respective special colors SC1, SC2, SC3, and SC4, and has checkboxes 221, 222, 223, and 224 corresponding respectively to the names E1. When the checkboxes 221 through 224 are operated, the information processing device 10 attaches the check mark when the check mark is absent, and remove the check mark when the check mark is present. The checkboxes 221 through 224 are each an operation element for adding an image of the special color patch PS to the display screen of the display device 20. The image of the special color patch PS corresponding to the checkbox where the check mark is present out of the checkboxes 221 through 224 is added to the display screen, and the special color patch PS the image of which has been added is printed by the printer 40 on the print target object ME1. The image of the special color patch PS corresponding to the checkbox where the check mark is absent out of the checkboxes 221 through 224 is not added to the display screen, and the special color patch PS the image of which is not added is not printed.

The processing section 11 receives (S304) pointing of the special color SC the special color patch PS of which is desired to be added to the display screen until the special color image addition button 225 shown in FIG. 13 is operated in cooperation with the input device 16.

When the processing section 11 receives an operation of the special color image addition button 225 shown in FIG. 13 in cooperation with the input device 16, the processing section 11 performs the processes in S108 and the subsequent steps shown in FIG. 12. When the check mark is present in the checkbox 212, the processes in S108 through S114 are performed, and such a print object PT1 as illustrated in FIG. 14 is formed in accordance with the image print job. As described above, the special color patches PS corresponding to the checkboxes where the check mark is present out of the checkboxes 221 through 224 are printed, and the special color patches PS corresponding to the checkboxes where the check mark is absent out of the checkboxes 221 through 224 are not printed. For example, when the check marks are present in the checkboxes 221, 223, and the check mark is absent from the checkboxes 222, 224 as shown in FIG. 13, the special color patches PS1, PS3 as the color patches of the special colors SC1, SC3 are printed on the print target object ME1, and the special color patches PS2, PS4 as the color patches of the special colors SC2, SC4 are not printed as shown in FIG. 14. Therefore, due to the processes in S302 through S304 and S108 through S114, the processing section 11 makes the display device 20 display the list 220 of the special colors SC included in the print target image IM1, then receives pointing of the special color patch PS to be printed in the list 220, and then makes the printer 40 perform printing of the special color patch PS pointing of which has been received.

Due to the processes described hereinabove, it is possible for the user to instruct whether to print the special color SC included in the print target image IM1 as the special color patch PS. Thus, the unwanted special color patch is not printed, and it is possible for the user to efficiently make the special color patch PS be printed.

In the determination process in S108 shown in FIG. 12, when the check mark is absent from the checkbox 212 shown in FIG. 13, the processes in S116 through S120 are performed. Although not shown in the drawings, the print image IM2 is formed on the print target object ME1 in accordance with the image print job, and the special color patch PS is printed on the print target object ME1 in accordance with the special color patch print job. Here, the special color patches PS corresponding to the checkboxes where the check mark is present out of the checkboxes 221 through 224 are also printed, and the special color patches PS corresponding to the checkboxes where the check mark is absent out of the checkboxes 221 through 224 are also not printed. Therefore, due to the processes in S302 through S304, S108, and S116 through S120, the processing section 11 also makes the display device 20 display the list 220 of the special colors SC included in the print target image IM1, then receives pointing of the special color patch PS to be printed in the list 220, and then makes the printer 40 perform printing of the special color patch PS pointing of which has been received.

Due to the processes described hereinabove, it is possible for the user to instruct whether to print the special color SC included in the print target image IM1 as the special color patch PS. Thus, the unwanted special color patch is not printed, and it is possible for the user to efficiently make the special color patch PS be printed.

As described hereinabove, also in the example shown in FIG. 12 through FIG. 14, by performing the printing of the special color patches PS in accordance with the output of the print image IM2, it is possible to surely perform the colorimetry of the special colors SC corresponding to the print image IM2, and thus, it is possible to suppress the colorimetric failure. Further, since the special color patch PS is efficiently printed, the present information processing device 10 is convenient.

Further, it is preferable to be able to perform an operation of assigning the image print job J1 and the special color patch print job J2 on the display screen as illustrated in FIG. 15 and FIG. 16. FIG. 15 shows another example of the print control process performed by the information processing device 10. FIG. 16 schematically illustrates the layout screen 300 representing the layout of the image print job J1 and the special color patch print job J2 to the print target object ME1.

When the print control process shown in FIG. 15 starts, the processing section 11 receives (S402) an operation of designating the print target image IM1 as an image to be printed, in cooperation with the input device 16. Then, the processing section 11 generates (S404) the image print job J1 for making the printer 40 print the print image IM2 based on the print target image IM1. Further, the processing section 11 generates (S406) the special color patch print job J2 for making the special color patches PS be printed separately from the image print job J1 based on the special color data DS shown in FIG. 3.

After generating the image print job J1 and the special color patch print job J2, the processing section 11 makes the display device 20 display (S408) such a layout screen 300 as shown in FIG. 16. The layout screen 300 shown in FIG. 16 has the print image IM2 included in the image print job J1, the special color patches PS and so on included in the special color patch print job J2, and a print execution button 311. In the special color patch print job J2, there are also included the names E1 and the color values E4 made to correspond to the respective special color patches PS. It should be noted that since the coordinate in the RGB color space is used for the display data output to the display device 20, the processing section 11 converts the pixel values of the print image IM2 or the print target image IM1 into the RGB values in accordance with the color conversion table of the color profile 30, and converts the pixel values of the special color patch PS or the special color SC into the RGB values in accordance with the color conversion table of the color profile 30. On that basis, the processing section 11 generates the display data of the layout screen 300 based on these RGB values, and outputs the display data to the display device 20 to thereby make the display device 20 display the layout screen 300. Subsequently, the processing section 11 receives (S410) an operation of changing the print position of the special color patch print job J2 in cooperation with the input device 16. Further, it is possible for the processing section 11 to receive an operation of changing the print position of the image print job J1 in cooperation with the input device 16.

Due to the processes described hereinabove, the processing section 11 performs the processing of receiving the change in layout of the image print job J1 and the special color patch print job J2 to the print target object ME1 in cooperation with the input device 16.

After the process in S410, the processing section 11 transmits (S412) the image print job J1 and the special color patch print job J2 to the printer 40 together with the information representing the layout the change of which has been received, and then terminates the print control process. The printer 40 having received the image print job J1 and the special color patch print job J2 together with the information representing the layout described above forms the print image IM2 on the print target object ME1 in accordance with the image print job J1 so as to achieve the layout described above, and then prints the special color patches PS on the print target object ME1 based on the special color patch print job J2. Therefore, the processing section 11 transmits the image print job J1 and the special color patch print job J2 to the printer 40 together with the information representing the layout described above to thereby realize the layout described above of the print image IM2 and the special color patches PS.

In the example shown in FIG. 15 and FIG. 16, since it is possible for the user to easily perform the layout of the print image IM2 and the special color patches PS, it is possible to reduce wasteful printing, and it is possible to efficiently make the print image IM2 and the special color patches PS be printed. As a result, it is possible for the example shown in FIG. 15 and FIG. 16 to reduce the cost related to the printing.

It should be noted that also in the example shown in FIG. 15 and FIG. 16, the special color patch PS to be printed can be limited to the special color patch PS which is instructed to be printed in such a manner as described with reference to FIG. 12 through FIG. 14.

(5) CONCLUSION

As described hereinabove, according to the present disclosure, it is possible to provide the technology and so on of preventing the deterioration of the accuracy in color matching of the special color with a variety of aspects. It is obvious that it is possible to obtain the basic functions and advantages described above with the technology constituted only by the constituents related to the independent claims in the appended claims.

Further, configurations obtained by replacing the constituents disclosed in the examples described above with each other, or modifying the combination thereof, configurations obtained by replacing the constituents disclosed in known technologies and the examples described above with each other, or modifying the combination thereof, and so on can also be implemented. The present disclosure includes these configurations and so on.

What is claimed is:

1. An information processing device configured to make a printing device execute printing, the information processing device comprising:
   a storage section configured to store special color data representing a special color included in a print target image; and
   a processing section configured to make the printing device print a special color patch as a color patch of the special color included in the print target image based on the special color data to obtain a colorimetric value of the special color patch, wherein
   based on the print target image and the special color data, the processing section makes the printing device execute printing of the special color patch in accordance with output of a print image based on the print target image.

2. The information processing device according to claim 1, wherein
   the printing device includes a drive section configured to relatively move a print target object and a recording head configured to perform recording on the print target object in a scanning direction, and
   the processing section performs control of aligning a position of the special color patch with a position of the special color included in the print image in the scanning direction.

3. The information processing device according to claim 2, wherein
   the scanning direction includes a main scanning direction in which the print target object and the recording head relatively move when the recording is performed, and a sub-scanning direction which crosses the main scanning direction, and in which the print target object and the recording head relatively move when the recording is not performed, and
   the processing section performs control of aligning the position of the special color patch with the position of the special color included in the print image in at least one of the main scanning direction and the sub-scanning direction.

4. The information processing device according to claim 2, wherein
   the special color included in the print target image includes a first special color, and a second special color different from the first special color,
   the special color patch includes a first special color patch as a color patch of the first special color and a second special color patch as a color patch of the second special color, and
   the processing section performs control of shifting a print range of the first special color patch and a print range of the second special color patch from each other in a direction perpendicular to the scanning direction when there is an overlap between the print range of the first special color patch and the print range of the second special color patch in the scanning direction.

5. The information processing device according to claim 1, wherein
   the processing section makes a display section display a list of the special colors included in the print target image, then receives pointing of the special color patch to be printed from the list, and then makes the printing device execute printing of the special color patch pointing of which was received.

6. The information processing device according to claim 1, wherein
   when a use area of the special color included in the print image is smaller than a predetermined size, the processing section makes a size of the special color patch larger than the use area of the special color.

7. The information processing device according to claim 1, wherein
   the processing section generates an image print job of making the print image be printed based on the print target image, generates a special color patch print job of making the special color patch be printed based on the special color data, makes a display section display a layout screen representing a layout of the image print job and the special color patch print job to the print target object, receives a change in the layout, pass the image print job and the special color patch print job to the printing device, and sets the print image and the special color patch in the layout the change of which was received.

8. A processing method of verifying a special color included in a print image, the method comprising:
   a print control step of making a printing device print a special color patch as a color patch of the special color included in a print target image based on special color data representing the special color included in the print target image; and
   a colorimetric value acquisition step of obtaining a colorimetric value of the special color patch, wherein
   in the print control step, based on the print target image and the special color data, the printing device is made to execute printing of the special color patch in accordance with output of the print image based on the print target image.

9. A non-transitory computer-readable storage medium storing a processing program of verifying a special color included in a print image, the processing program making a computer implement functions comprising:
- a print control function of making a printing device print a special color patch as a color patch of the special color included in a print target image based on special color data representing the special color included in the print target image; and
- a colorimetric value acquisition function of obtaining a colorimetric value of the special color patch, wherein
- based on the print target image and the special color data, the print control function makes the printing device execute printing of the special color patch in accordance with output of the print image based on the print target image.

* * * * *